(12) United States Patent
Sato

(10) Patent No.: US 6,760,287 B2
(45) Date of Patent: Jul. 6, 2004

(54) OPTICAL DISK UNIT

(75) Inventor: Shinichi Sato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/396,099

(22) Filed: Mar. 25, 2003

(65) Prior Publication Data

US 2003/0185123 A1 Oct. 2, 2003

Related U.S. Application Data

(63) Continuation of application No. 09/865,014, filed on May 24, 2001, now Pat. No. 6,563,775.

(30) Foreign Application Priority Data

May 31, 2000 (JP) ........................................ 2000-161357

(51) Int. Cl.[7] ................................................. G11B 7/00
(52) U.S. Cl. ................. 369/47.53; 369/116; 369/59.11; 369/59.12
(58) Field of Search .............................. 369/47.1, 47.5, 369/47.51, 47.52, 47.53, 47.54, 47.55, 53.1, 53.11, 59.1, 59.11, 59.12, 116

(56) References Cited

U.S. PATENT DOCUMENTS 5,949,747 A * 9/1999 Miyashita et al. ........ 369/53.26
6,108,289 A 8/2000 Hashimoto
6,172,955 B1 1/2001 Hashimoto
6,418,102 B1 7/2002 Suga
6,480,449 B1 11/2002 Narumi et al.
6,556,524 B1 * 4/2003 Takeshita ................. 369/47.43

FOREIGN PATENT DOCUMENTS

| JP | 7021585 | 1/1995 |
|---|---|---|
| JP | 9231580 | 9/1997 |
| JP | 9270129 | 10/1997 |
| JP | 10079124 | 3/1998 |
| JP | 11066726 | 3/1999 |
| JP | 11296858 | 10/1999 |
| JP | 200011384 | 1/2000 |
| JP | 200048484 | 2/2000 |

* cited by examiner

*Primary Examiner*—Muhammad Edun
(74) *Attorney, Agent, or Firm*—Cooper & Dunham LLP

(57) ABSTRACT

An optical disk unit presets a value $\theta_1$, which prescribes an optimum recording pulse width of a light source for a case where the optical disk is rotated at a predetermined linear velocity on a track located at a predetermined radial position on the optical disk, and an optimum power ratio $\Delta P$ of an extra pulse at a leading portion of the recording pulse where power is increased. Information is recorded on the optical disk while controlling a light emission waveform of the light source based on a value $\theta_1(v)$ which prescribes the recording pulse width, a power ratio $\Delta P(v)$ and an optimum recording power $Pwo(v)$ which are successively calculated.

72 Claims, 14 Drawing Sheets

OPTICAL DISK UNIT

This is a continuation of application Ser. No. 09/865,014 filed May 24, 2001, now U.S. Pat. No. 6,563,775.

This application claims the benefit of a Japanese Patent Application No. 2000-161357 filed May 31, 2000, in the Japanese Patent Office, the disclosure of which is hereby incorporated by reference.

BACKGROUND OF THE INVENTION

1. Field of the Invention

The present invention generally relates to optical disk units, and more particularly to an optical disk unit which uses a writable (recordable) or rewritable optical disk.

2. Description of the Related Art

Generally, in an optical disk called a compact disk (CD), a spiral track is formed at a constant liner density from an inner periphery to an outer periphery of the disk. In addition, information can be recorded in a CD called a CD-Recordable (CD-R). When recording the information on the CD-R, the information is also recorded at a constant linear density on a spiral track which is formed from the inner periphery to the outer periphery of the CD-R. Information is similarly recorded on a CD called a CD-Rewritable (CD-RW), that is, at a constant linear density on a spiral track which is formed from the inner periphery to the outer periphery of the CD-RW. The information is rewritable in the case of the CD-RW.

Recording and reproducing systems used to record information on and reproduce information from the optical disks such as the CD-R and the CD-RW can generally by categorized into a constant linear velocity (CLV) system and a constant angular velocity (CAV) system. There is also a recording and reproducing system called a zone constant linear velocity (ZCLV) system which is a modification of the CLV system. For example, such recording and reproducing systems are proposed in Japanese Laid-Open Patent Applications No. 11-296858, 2000-11384, No. 2000-48484, No. 7-21585, No. 9-231580, No. 9-270129, No. 10-79124, and No. 11-66726.

According to the CLV system, the optical disk is rotated at a constant linear velocity. Hence, although data management and rotational velocity control become slightly complex, it is possible to maximize a recording capacity by the CLV system. On the other hand, according to the CAV system, the optical disk is rotated at a constant angular velocity, that is, at a constant number of revolutions. For this reason, the data management and the rotational velocity control become simple, but the recording capacity is slightly sacrificed according to the CAV system. According to the ZCLV system, a recording surface of the optical disk is divided into a plurality of zones, and the linear velocity is maintained constant within each of the zones, similarly to the CLV system. The ZCLV system changes the rotational velocity for each zone so that the rotational velocity increases towards the outer periphery of the optical disk.

When recording information on the recordable or rewritable optical disks such as the CD-R and the CD-RW, the CAV system or the ZCLV system is employed by placing priority on the ease of the rotation control of the optical disk. Particularly, the CAV system is desirable in order to satisfy the recent demands to improve the recording velocity (rate) and realize a recording such as a 20-times speed recording.

However, when the optical disk in conformance with the CLV system, such as the CD-R and the CD-RW, is rotated according to the CAV system, the linear velocity increases as a radial position on the optical disk moves towards the outer periphery of the optical disk. But since an optimum recording laser power increases proportionally to the linear velocity, it is not possible to record the information at an optimum recording power in an outer peripheral portion of the optical disk if the recording power is maintained constant.

In addition, a setting of a write strategy (light emission waveform of a semiconductor laser) shown in FIG. 1 with respect to the CD-R does not lead to an ideal recording mark on the optical disk as shown in FIG. 2A when a high-speed write is carried out. Instead, the actual recording mark on the optical disk typically becomes as shown in FIG. 2B when the high-speed write is carried out. In FIG. 2B, a portion ① corresponds to a shape which is formed due to insufficient heat transfer to the optical disk immediately after the irradiation of the laser beam on the optical disk starts, and a portion ② corresponds to a shape which is formed due to insufficient heat release immediately after the irradiation of the laser beam on the optical disk ends.

Accordingly, as shown in FIG. 1, with respect to a recording clock period T at each linear velocity, the laser power at a leading portion of a recording pulse is set larger than at a trailing portion of the recording pulse, in a form of an extra pulse, and a recording pulse width is set narrower than the actual width which is to be written. With regard to the recording clock period T, 1T denotes a 1 times-speed reproduction of 1.2 to 1.4 m/s, for example, and amounts to 231.4 ns. Such a modification of the write strategy is mainly made by changing a value $\theta_1$ which prescribes the recording pulse width $n-\theta_1 T$ indicated by ① in FIG. 1, and/or changing a power $\Delta P$ of the extra pulse indicated by ④ in FIG. 1, where n denotes an integer from 2 to 11 of an EFM signal. In FIG. 1, a portion ② corresponds to a pulse width $\alpha T$, and a portion ③ corresponds to a recording power Pw.

In addition, FIG. 3 shows a write strategy with respect to the CD-RW using multi-recording pulses. In the case of the recent high-speed write with respect to the optical disk, a peak pulse width at a leading portion of the multi-recording pulses is set wide with respect to the recording clock period T for each linear velocity, so as to facilitate heat transfer to the optical disk immediately after the irradiation of the laser beam on the optical disk starts. Moreover, an OFF-pulse width at a last portion of the multi-recording pulses is set narrow so as to adjust the remaining heat effect. In order to form an ideal recording mark on the optical disk, such a modification of the write strategy is mainly made by changing a peak pulse width $\theta_2$ at a portion ① shown in FIG. 3, and/or changing an OFF-pulse width xn at a portion ② shown in FIG. 3. In FIG. 3, a portion ③ corresponds to an intermediate pulse width.

In any case, the setting of the write strategy is changed for each recording linear velocity. For this reason, in the case of the CD-R, there is a problem in that the recording cannot be made under an optimum recording condition if the value $\theta_1$ which prescribes the recording pulse width $n-\theta_1 T$ and the power $\Delta P$ of the extra pulse remain constant. In the case of the CD-RW, there is a problem in that the recording cannot be made under an optimum recording condition if the peak pulse width $\theta_2$ and the OFF-pulse width xn remain constant.

Such problems similarly occur when rotating the optical disk, such as the CD-R and the CD-RW, according to the ZCLV system.

SUMMARY OF THE INVENTION

Accordingly, it is a general object of the present invention to provide a novel and useful optical disk unit in which the problems described above are eliminated.

Another and more specific object of the present invention is to provide an optical disk unit which can always record information with respect to a recordable or rewritable optical disk at an optimum recording condition, using the CAV system or the ZCLV system which can improve the recording velocity as compared to the CLV system.

Still another object of the present invention is to provide an optical disk unit which can cope with a case where an optical disk used has a low recording sensitivity and/or a case where a light source used has a low maximum power output.

A further object of the present invention is to provide an optical disk unit which can cope with a case where optical disks used are manufactured by different manufacturers.

Another object of the present invention is to provide an optical disk unit which can cope with a case where optical disks used are manufactured by the same manufacturer but are of different types.

Still another object of the present invention is to provide an optical disk unit comprising a light source irradiating a light beam on a recordable optical disk; rotationally driving means for rotating the optical disk; setting means for presetting a value $\theta_1$ which prescribes an optimum recording pulse width of the light source for a case where the optical disk is rotated at a predetermined linear velocity on a track located at a predetermined radial position on the optical disk, and an optimum power ratio $\Delta P$ of an extra pulse at a leading portion of the recording pulse where power is increased; test write means for carrying out a test write a predetermined number of times prior to recording, on the track located at the predetermined radial position on the optical disk, by driving the light source at a recording power which differs for each step, while rotating the optical disk by the rotationally driving means at the predetermined linear velocity, using the value $\theta_1$ which prescribes the optimum recording pulse width the optimum power ratio $\Delta P$ of the extra pulse which are preset by the setting means; reference optimum recording power determination means for reproducing data recorded by the test write carried out by the test write means, and determining an optimum recording power Pwo based on characteristic values of the reproduced data; recording rotation control means for rotating the optical disk by the rotationally driving means at a predetermined number of revolutions when recording information; light emission waveform updating computation means for successively calculating a value $\theta_1(v)$ which prescribes the recording pulse width, a power ratio $\Delta P(v)$ and an optimum recording power Pwo(v), depending on an arbitrary linear velocity v at a recording target track which is to be recorded, by adding corrections dependent on the arbitrary linear velocity v with respect to the value $\theta_1$ which prescribes the optimum recording pulse width when recording the information, the power ratio $\Delta P$ and the optimum recording power Pwo which is determined by the reference optimum recording power determination means; and recording light source control means for recording the information while controlling a light emission waveform of the light source based on the value $\theta_1(v)$ which prescribes the recording pulse width, the power ratio $\Delta P(v)$ and the optimum recording power Pwo(v) which are successively calculated by the light emission waveform update computation means. According to the optical disk unit of the present invention, it is possible to improve the recording velocity because the optical disk is basically rotated at the predetermined number of revolutions in conformance with the CAV system during the recording. Furthermore, since the value $\theta_1(v)$ which prescribes the recording pulse width, the power ratio $\Delta P(v)$ and the optimum recording power Pwo(v) are successively calculated, and the recording is carried out while controlling the light emission waveform of the light source based on the calculated values, it is possible to always record the information under a stable recording condition in conformance with the CAV system, even if the linear velocity during the recording changes.

The optical disk unit may further comprise judging means for judging whether or not the optimum recording power Pwo(v) calculated by the light emission waveform update computation means depending on the arbitrary linear velocity v on the track reaches a predetermined upper limit value of an output power of the light source, where the recording rotation control means switches rotation to rotate the optical disk by the rotationally driving means at a constant linear velocity in a track region in which the judging means judges that the optimum recording power Pwo(v) reaches the predetermined upper limit value of the output power of the light source. According to the optical disk unit of the present invention, a decision is made to determine whether or not the optimum recording power Pwo(v) reaches the maximum output Pwmax of the light source. The recording is carried out in conformance with the CAV system at the original predetermined number of revolutions in a track region in which the maximum output Pwmax is not exceeded. On the other hand, in a track region in which the maximum output Pwmax is reached or exceeded, the recording is carried out in conformance with the CLV system at the constant linear velocity which introduces no change in the linear velocity v. For this reason, it is possible to continue the recording at the maximum output of the light source, and it is thus possible to cope with cases where the light source used has a low maximum output for the recording power and the optical disk used has a low recording sensitivity, by a minimum required decrease in the recording velocity.

A further object of the present invention is to provide an optical disk unit for recording information on a recordable optical disk which has a recording surface divided into a plurality of zones in a radial direction thereof, by rotating the optical disk at a rotational velocity which is different for each zone so that a linear velocity within each zone is approximately constant, comprising a light source irradiating a light beam on the optical disk; rotationally driving means for rotating the optical disk; setting means for presetting a value $\theta_1$ which prescribes an optimum recording pulse width of the light source for a case where the optical disk is rotated at a predetermined linear velocity on a track located at a predetermined radial position on the optical disk, and an optimum power ratio $\Delta P$ of an extra pulse at a leading portion of the recording pulse where power is increased; test write means for carrying out a test write a predetermined number of times prior to recording, on the track located at the predetermined radial position on the optical disk, by driving the light source at a recording power which differs for each step, while rotating the optical disk by the rotationally driving means at the predetermined linear velocity, using the value $\theta_1$ which prescribes the optimum recording pulse width the optimum power ratio $\Delta P$ of the extra pulse which are preset by the setting means; reference optimum recording power determination means for reproducing data recorded by the test write carried out by the test write means, and determining an optimum recording power Pwo based on characteristic values of the reproduced data; recording rotation control means for rotating the optical disk by the rotationally driving means at a rotational velocity which is different for each zone so that a predetermined linear velocity is approximately obtained within each zone when recording information; light emission waveform updating computation means for successively calculating a value $\theta_1(v)$ which prescribes the recording pulse width, a power ratio $\Delta P(v)$ and an optimum recording power Pwo(v), depending on an arbitrary linear velocity v at a recording target zone which is to be recorded, by adding corrections dependent on the arbitrary linear velocity v with respect to the value $\theta_1$ which prescribes the optimum recording pulse width when recording the information, the power ratio $\Delta P$ and the optimum recording power Pwo which is determined by the reference optimum recording power determination means; and recording light source control means for recording the information while controlling a light emission waveform of the light source based on the value $\theta_1(v)$ which prescribes the recording pulse width, the power ratio $\Delta P(v)$ and the optimum recording power Pwo(v) which are successively calculated by the light emission waveform update computation means. According to the optical disk unit of the present invention, the setting of the value $\theta_1$ which prescribes the optimum recording pulse width and the power ratio $\Delta P$ and the determination of the optimum recording power Pwo only need to be carried out once based on a PCA which has the predetermined radial position and in which the linear velocity is the predetermined linear velocity. Thereafter, the value $\theta_1(v)$ which prescribes the recording pulse width, the power ratio $\Delta P(v)$ and the optimum recording power Pwo(v) can be successively calculated and set depending on the linear velocity v of the target recording zone, so that it is possible to always record the information under a stable recording condition, even with respect to the ZCLV system.

The optical disk unit may further comprise judging means for judging whether or not the optimum recording power Pwo(v) calculated by the light emission waveform update computation means depending on the arbitrary linear velocity v on the track reaches a predetermined upper limit value of an output power of the light source, where the recording rotation control means switches rotation to rotate the optical disk by the rotationally driving means at a linear velocity with which the predetermined upper limit value becomes the optimum recording power Pwo(v) in a recording zone region in which the judging means judges that the optimum recording power Pwo(v) reaches the predetermined upper limit value of the output power of the light source. According to the optical disk unit of the present invention, a decision is made to determine whether or not the optimum recording power Pwo(v) reaches the maximum output Pwmax of the light source. The recording is carried out in conformance with the CLV system at the original predetermined linear velocity in a recording zone region in which the maximum output Pwmax is not exceeded. On the other hand, in a recording zone region in which the maximum output Pwmax is reached or exceeded, the recording is carried out in conformance with the ZCLV system at the constant linear velocity which introduces no change in the linear velocity v within each recording zone. For this reason, it is possible to continue the recording at the maximum output of the light source, and it is thus possible to cope with cases where the light source used has a low maximum output for the recording power and the optical disk used has a low recording sensitivity, by a minimum required decrease in the recording velocity.

The optical disk unit may further comprise manufacturer judging means for judging a manufacturer of the optical disk based on an identification code prerecorded on the optical disk, where the light emission waveform updating computation means calculates the value $\theta_1(v)$ which prescribes the recording pulse width, the power ratio $\Delta P(v)$ and the optimum recording power Pwo(v), depending on the arbitrary linear velocity v and coefficients which are preset for each manufacturer judged by the manufacturer judging means. According to the optical disk unit of the present invention, the media manufacturer of the optical disk used is judged based on the identification code prerecorded on the optical disk, and the value $\theta_1(v)$ which prescribes the recording pulse width, the power ratio $\Delta P(v)$ and the optimum recording power Pwo(v) are respectively calculated by taking into consideration the coefficients of the judged media manufacturer. The coefficients are preset for each of the media manufacturers. As a result, it is possible to. appropriately cope with the differences among the media manufacturers of the optical disk which is used by the optical disk unit.

Furthermore, the manufacturer judging means may further judges a type of the optical disk, and the light emission waveform updating computation means uses for the calculation values which are obtained by multiplying constants to corresponding ones of the coefficients depending on the type of the optical disk judged by the manufacturer judging means. According to the optical disk unit of the present invention, by also judging the type of the optical disk, the value $\theta_1(v)$ which prescribes the recording pulse width, the power ratio $\Delta P(v)$ and the optimum recording power Pwo(v) are calculated by taking into consideration the values which are obtained by multiplying the coefficients which differ depending on the type of the optical disk with respect to the corresponding coefficients which are preset for each judged media manufacturer. Consequently, it is possible to appropriately cope with optical disks manufactured by different media manufacturers as well as different type of optical disks.

Another object of the present invention is to provide an optical disk unit comprising a light source irradiating a light beam on a rewritable optical disk; rotationally driving means for rotating the optical disk; setting means for presetting an optimum peak pulse width $\theta_2$ at a leading portion of multi-recording pulses of the light source and an OFF-pulse width xn at a last portion of the multi-recording pulses for a case where the optical disk is rotated at a predetermined linear velocity on a track located at a predetermined radial position on the optical disk; test write means for carrying out a test write a predetermined number of times prior to recording, on the track located at the predetermined radial position on the optical disk, by driving the light source at a recording power which differs for each step, while rotating the optical disk by the rotationally driving means at the predetermined linear velocity, using the peak pulse width $\theta_2$ and the OFF-pulse width xn which are preset by the setting means; reference optimum recording power determination means for reproducing data recorded by the test write carried out by the test write means, and determining an optimum recording power Pwo based on characteristic values of the reproduced data; recording rotation control means for rotating the optical disk by the rotationally driving means at a predetermined number of revolutions when recording information; light emission waveform updating computation means for successively calculating a peak pulse width $\theta_2(v)$, an OFF-pulse width xn(v) and an optimum recording power Pwo(v), depending on an arbitrary linear velocity v at a recording target track which is to be recorded, by adding corrections dependent on the arbitrary linear velocity v with respect to the peak pulse width $\theta_2$, the OFF-pulse width xn and the optimum recording power Pwo which is determined by the reference optimum recording power determination means; and recording light source control means for recording the information while controlling a light emission waveform of the light source based on the peak pulse width $\theta_2(v)$, the OFF-pulse width xn(v) and the optimum recording power Pwo(v) which are successively calculated by the light emission waveform update computation means. According to the optical disk unit of the present invention, it is possible to improve the recording velocity because the optical disk is basically rotated at the predetermined number of revolutions in conformance with the CAV system during the recording. Furthermore, since the peak pulse width $\theta_2(v)$, the OFF-pulse width xn(v) and the optimum recording power Pwo(v) are successively calculated, and the recording is carried out while controlling the light emission waveform of the light source based on the calculated values, it is possible to always record the information under a stable recording condition in conformance with the CAV system, even if the linear velocity during the recording changes.

The optical disk unit may further comprise judging means for judging whether or not the optimum recording power Pwo(v) calculated by the light emission waveform update computation means depending on the arbitrary linear velocity v on the track reaches a predetermined upper limit value of an output power of the light source, where the recording rotation control means switches rotation to rotate the optical disk by the rotationally driving means at a constant linear velocity in a track region in which the judging means judges that the optimum recording power Pwo(v) reaches the predetermined upper limit value of the output power of the light source. According to the optical disk unit of the present invention, a decision is made to determine whether or not the optimum recording power Pwo(v) reaches the maximum output Pwmax of the light source. The recording is carried out in conformance with the CAV system at the original predetermined number of revolutions in a track region in which the maximum output Pwmax is not exceeded. On the other hand, in a track region in which the maximum output Pwmax is reached or exceeded, the recording is carried out in conformance with the CLV system at the constant linear velocity which introduces no change in the linear velocity v. For this reason, it is possible to continue the recording at the maximum output of the light source, and it is thus possible to cope with cases where the light source used has a low maximum output for the recording power and the optical disk used has a low recording sensitivity, by a minimum required decrease in the recording velocity.

Still another object of the present invention is to provide an optical disk unit for recording information on a rewritable optical disk which has a recording surface divided into a plurality of zones in a radial direction thereof, by rotating the optical disk at a rotational velocity which is different for each zone so that a linear velocity within each zone is approximately constant, comprising a light source irradiating a light beam on the optical disk; rotationally driving means for rotating the optical disk; setting means for pre-setting a peak pulse width $\theta_2$ at a leading portion of multi-recording pulses of the light source and an OFF-pulse width xn at a last portion of the multi-recording pulses for a case where the optical disk is rotated at a predetermined linear velocity on a track located at a predetermined radial position on the optical disk; test write means for carrying out a test write a predetermined number of times prior to recording, on the track located at the predetermined radial position on the optical disk, by driving the light source at a recording power which differs for each step, while rotating the optical disk by the rotationally driving means at the predetermined linear velocity, using the peak pulse width $\theta_2$ and the OFF-pulse width xn which are preset by the setting means; reference optimum recording power determination means for reproducing data recorded by the test write carried out by the test write means, and determining an optimum recording power Pwo based on characteristic values of the reproduced data; recording rotation control means for rotating the optical disk by the rotationally driving means at a rotational velocity which is different for each zone so that a predetermined linear velocity is approximately obtained within each zone when recording information; light emission waveform updating computation means for successively calculating a peak pulse width $\theta_2(v)$, an OFF-pulse width xn(v) and an optimum recording power Pwo(v), depending on an arbitrary linear velocity v at a recording target zone which is to be recorded, by adding corrections dependent on the arbitrary linear velocity v with respect to the peak pulse width $\theta_2$, the OFF-pulse width xn and the optimum recording power Pwo which is determined by the reference optimum recording power determination means; and recording light source control means for recording the information while controlling a light emission waveform of the light source based on the peak pulse width $\theta_2(v)$, the OFF-pulse width xn(v) and the optimum recording power Pwo(v) which are successively calculated by the light emission waveform update computation means 10. The optical disk unit as claimed in claim 13, further comprising judging means for judging whether or not the optimum recording power Pwo(v) calculated by the light emission waveform update computation means depending on the arbitrary linear velocity v on the track reaches a predetermined upper limit value of an output power of the light source, where the recording rotation control means switches rotation to rotate the optical disk by the rotationally driving means at a linear velocity with which the predetermined upper limit value becomes the optimum recording power Pwo(v) in a recording zone region in which the judging means judges that the optimum recording power Pwo(v) reaches the predetermined upper limit value of the output power of the light source. According to the optical disk unit of the present invention, the setting of the peak pulse width $\theta_2(v)$ and the OFF-pulse width xn(v) and the determination of the optimum recording power Pwo only need to be carried out once based on a PCA which has the predetermined radial position and in which the linear velocity is the predetermined linear velocity. Thereafter, the peak pulse width $\theta_2(v)$, the OFF-pulse width xn(v) and the optimum recording power Pwo(v) can be successively calculated and set depending on the linear velocity v of the target recording zone, so that it is possible to always record the information under a stable recording condition, even with respect to the ZCLV system.

The optical disk unit may further comprise judging means for judging whether or not the optimum recording power Pwo(v) calculated by the light emission waveform update computation means depending on the arbitrary linear velocity v on the track reaches a predetermined upper limit value of an output power of the light source, where the recording rotation control means switches rotation to rotate the optical disk by the rotationally driving means at a linear velocity with which the predetermined upper limit value becomes the optimum recording power Pwo(v) in a recording zone region in which the judging means judges that the optimum recording power Pwo(v) reaches the predetermined upper limit value of the output power of the light source. According to the optical disk unit of the present invention, a decision is made to determine whether or not the optimum recording power Pwo(v) reaches the maximum output Pwmax of the light source. The recording is carried out in conformance with the CLV system at the original predetermined linear velocity in a recording zone region in which the maximum output Pwmax is not exceeded. On the other hand, in a recording zone region in which the maximum output Pwmax is reached or exceeded, the recording is carried out in conformance with the ZCLV system at the constant linear velocity which introduces no change in the linear velocity v within each recording zone. For this reason, it is possible to continue the recording at the maximum output of the light source, and it is thus possible to cope with cases where the light source used has a low maximum output for the recording power and the optical disk used has a low recording sensitivity, by a minimum required decrease in the recording velocity.

The optical disk unit may further comprise manufacturer judging means for judging a manufacturer of the optical disk based on an identification code prerecorded on the optical disk, where the light emission waveform updating computation means calculates the peak pulse width $\theta_2(v)$, the OFF-pulse width $xn(v)$ and the optimum recording power $Pwo(v)$, depending on the arbitrary linear velocity v and coefficients which are preset for each manufacturer judged by the manufacturer judging means. According to the optical disk unit of the present invention, the media manufacturer of the optical disk used is judged based on the identification code prerecorded on the optical disk, and the peak pulse width $\theta_2(v)$, the OFF-pulse width $xn(v)$ and the optimum recording power $Pwo(v)$ are respectively calculated by taking into consideration the coefficients of the judged media manufacturer. The coefficients are preset for each of the media manufacturers. As a result, it is possible to appropriately cope with the differences among the media manufacturers of the optical disk which is used by the optical disk unit.

Furthermore, the manufacturer judging means may further judges a type of the optical disk, and the light emission waveform updating computation means uses for the calculation values which are obtained by multiplying constants to corresponding ones of the coefficients depending on the type of the optical disk judged by the manufacturer judging means. According to the optical disk unit of the present invention, by also judging the type of the optical disk, the peak pulse width $\theta_2(v)$, the OFF-pulse width $xn(v)$ and the optimum recording power $Pwo(v)$ are calculated by taking into consideration the values which are obtained by multiplying the coefficients which differ depending on the type of the optical disk with respect to the corresponding coefficients which are preset for each judged media manufacturer. Consequently, it is possible to appropriately cope with optical disks manufactured by different media manufacturers as well as different type of optical disks.

Other objects and further features of the present invention will be apparent from the following detailed description when read in conjunction with the accompanying drawings.

DESCRIPTION OF THE PREFERRED EMBODIMENTS

A description will be given of a first embodiment of an optical disk unit according to the present invention, by referring to FIGS. 4 through 6. In this embodiment, the present invention is applied to a case where information is recorded on and/or reproduced from a recordable optical disk, that is, a CD-R.

Figure 4:
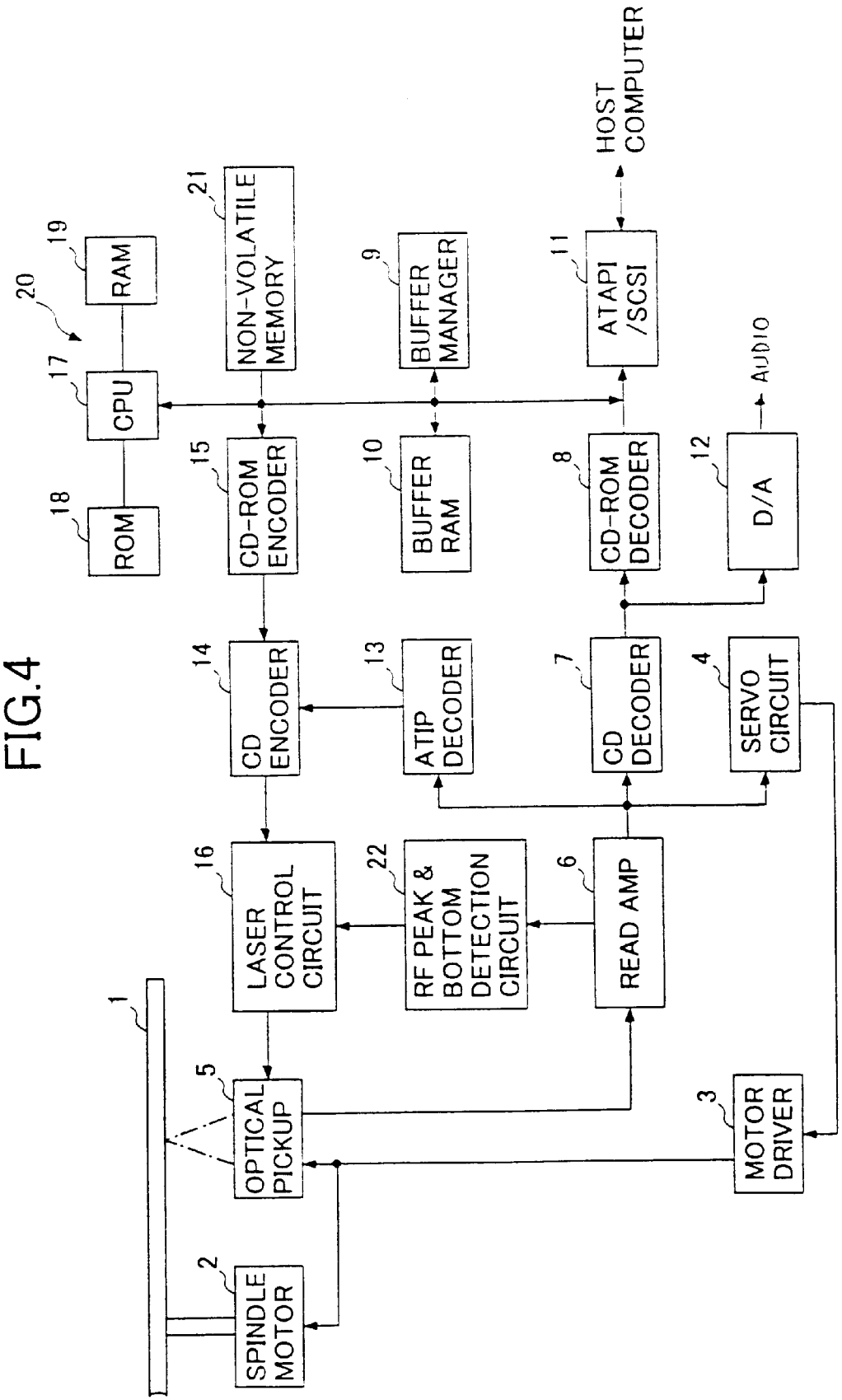
FIG. 4 is a system block diagram showing a general structure of a first embodiment of an optical disk unit according to the present invention.

FIG. 4 is a system block diagram showing a general structure of this first embodiment of the optical disk unit (optical disk drive). In FIG. 4, a spindle motor 2 forms a rotationally driving means for rotating an optical disk 1. The spindle motor 2 is controlled to a constant linear velocity (CLV) or to a constant number of revolutions (CAV), by a motor driver 3 and a servo circuit 4. An optical pickup 5 has a known structure including a light source which is formed by a semiconductor laser, an optical system, a focusing actuator, a tracking actuator, a light receiving element, a position sensor and the like which are not shown in FIG. 4 The optical pickup 5 irradiates a laser beam on a recording surface of the optical disk 1.

The optical pickup 5 is movable in a sledge direction, that is, in a radial direction of the optical disk 1, by a known seek motor (not shown) The motor driver 3 and the servo circuit 4 control a laser spot of the laser beam to a target position on the optical disk 1, based on signals obtained from the focusing actuator, the tracking actuator, the seek motor, the light receiving element and the position sensor During a data reproduction, a reproduced signal obtained by the optical pickup 5 is amplified and binarized by a read amplifier 6, before being input to a CD decoder 7 which carries out deinterleaving and error correction processes. After the deinterleaving and error correction processes, reproduced data are input to a CD-ROM decoder 8 which carries out an error correction for improving a reliability of the data.

Thereafter, the data processed by the CD-ROM decoder 8 are temporarily stored in a buffer RAM 10 by a buffer manager 9, and when a sector data is obtained, the sector data is transferred to a host computer (not shown) via the ATAPI/SCSI interface 11. In a case where the data read from the optical disk 1 are music data, the data output from the CD decoder 7 are input to a digital-to-analog (D/A) converter 12 to obtain an analog audio signal. This analog audio signal is transferred to the host computer via the ATAPI/SCSI interface 11, so as to make an audio output at the host computer.

On the other hand, during a data recording, data from the host computer are received by the ATAPI/SCSI interface 11, and the received data are temporarily stored in the buffer RAM 10 by the buffer manager 9. The recording is started when a certain amount of data is stored in the buffer RAM 10, but before starting the recording, the laser spot is positioned to a write start position on the optical disk 1. The write start position is obtained from a wobble signal which is prerecorded in the form of a wave-shaped track on the optical disk 1. The wobble signal includes absolute time information called ATIP, and the ATIP information is obtained by the ATIP decoder 13.

In addition, a synchronizing signal generated from the ATIP decoder 13 is input to the CD encoder 14, so that the data can be written at an accurate position. The data stored in the buffer RAM 10 are subjected to processes, such as adding an error correction core and interleaving, in a CD-ROM encoder 15 and a CD encoder 14, and are recorded on the optical disk 1 via a laser control circuit 16 and the optical pickup 5.

The optical disk unit also includes a microcomputer 20 for controlling operations of the various parts of the optical disk unit described above, and for carrying out various functions which will be described later. The microcomputer 20 has a known structure including a CPU 17, a ROM 18 and a RAM. Further, a non-volatile memory 21 is coupled to the CPU 17, and a RF peak and bottom detection circuit 22 is coupled between the read amplifier 6 and the laser control circuit 16.

Figure 5:
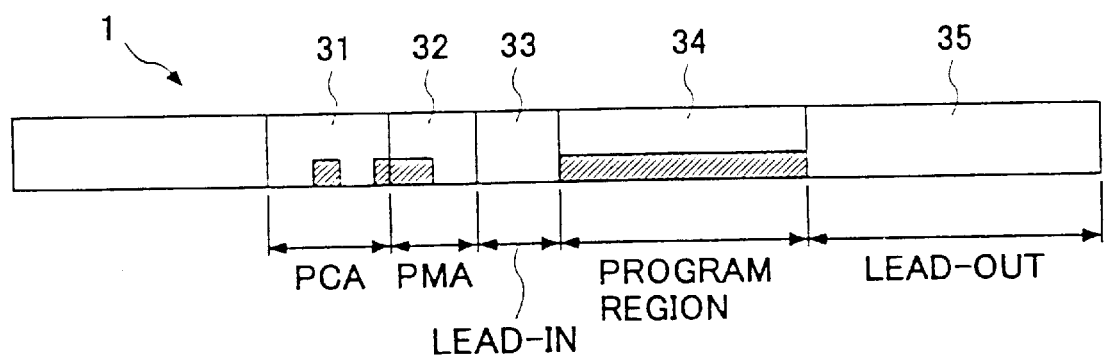
FIG. 5 is a diagram for explaining an area structure of an optical disk.

FIG. 5 is a diagram showing an area structure of the optical disk 1, that is, the CD-R. FIG. 5 shows a cross section taken along a radial direction of the optical disk 1. The recording surface of the optical disk 1 includes, from the inner periphery towards the outer periphery thereof, a power calibration area (PCA) 31, a program memory area (PMA) 32, a lead-in area 33, a program region 34, and a lead-out area 35. The optical disk unit adjusts the recording laser power by a so-called optimum power control (OPC) in the PCA 31 which is allocated for tracks at predetermined radial positions on the optical disk 1, and carries out the data recording using the laser power which is obtained as a result of the OPC.

During the data recording, the data received from the host computer via the ATAPI/SCSI interface 11 are temporarily stored in the buffer RAM 10 before starting the recording. Excluding a case where the OPC result of the recording carried out in the past with respect to the optical disk 1 is prestored in the non-volatile memory 21, the OPC is carried out in the PCA 31 of the optical disk 1 prior to the recording, so as to obtain the optimum recording power of the semiconductor laser. When carrying out the OPC, a test write amounting to a predetermined number of blocks (for example, fifteen blocks) corresponding to a predetermined number of times is carried out while increasing the recording power of the semiconductor laser for each one block (for each one step) in the PCA 31 of the optical disk 1.

Figure 1:
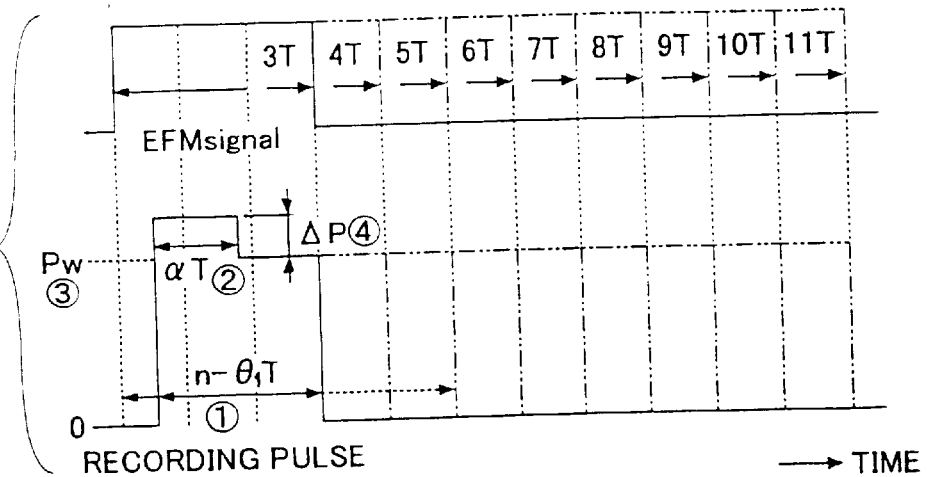
FIG. 1 is a time chart for explaining a write strategy for a CD-R.
Figure 2A:
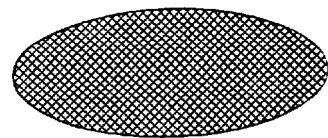
FIGS. 2A and 2B are diagrams for explaining shapes of a recording mark.
Figure 2B:
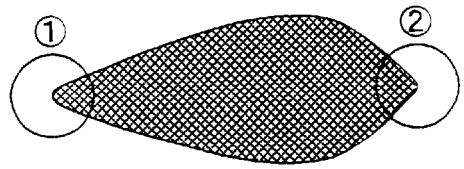

When carrying out the OPC, a data signal dependent on a reflected light received by the optical pickup 5 is amplified by the read amplifier 6, and is input to the peak and bottom detection circuit 22. The peak and bottom detection circuit 22 detects an upper peak level P and a lower peak (bottom) level B of the data signal. The detected peak levels A and B are subjected to an analog-to-digital (A/D) conversion to obtain digital peak levels. The CPU 17 or the like measures a β value which describes an RF signal symmetry given by a formula $\beta=(P+B)/(P-B)$ as indicated in the Orange Book Part II, based on the digital peak levels, and determines a recording power which is used in a block where the β value is closest to a target value (for example, 0.04) as the optimum recording power. When carrying out the OPC, the optical disk 1 is rotated according to the CLV system so that the linear velocity is constant. The optimum recording power is calculated in such a manner and is instructed to the laser control circuit 16. A write strategy with respect to the optical disk 1, that is, the CD-R, is as shown in FIG. 1 described above. Hence, a leading portion of a recording pulse includes an extra pulse having a power which is larger by a power ratio ΔP with respect to a recording power Pw, and the recording pulse has a recording pulse width n−θ$_1$T which is prescribed by a value θ$_1$.

Under the preconditions described above, when the recordable optical disk 1 is loaded into the optical disk unit of this embodiment and a record (write) instruction is received from the host computer, the CPU 17 carries out the functions of a setting means, a test write means, a reference optimum recording power determination means, a recording rotation control means, a light emission waveform updating computation means, and a recording light source control means. FIG. 6 is a flow chart for generally explaining a recording process of this first embodiment.

Figure 6:
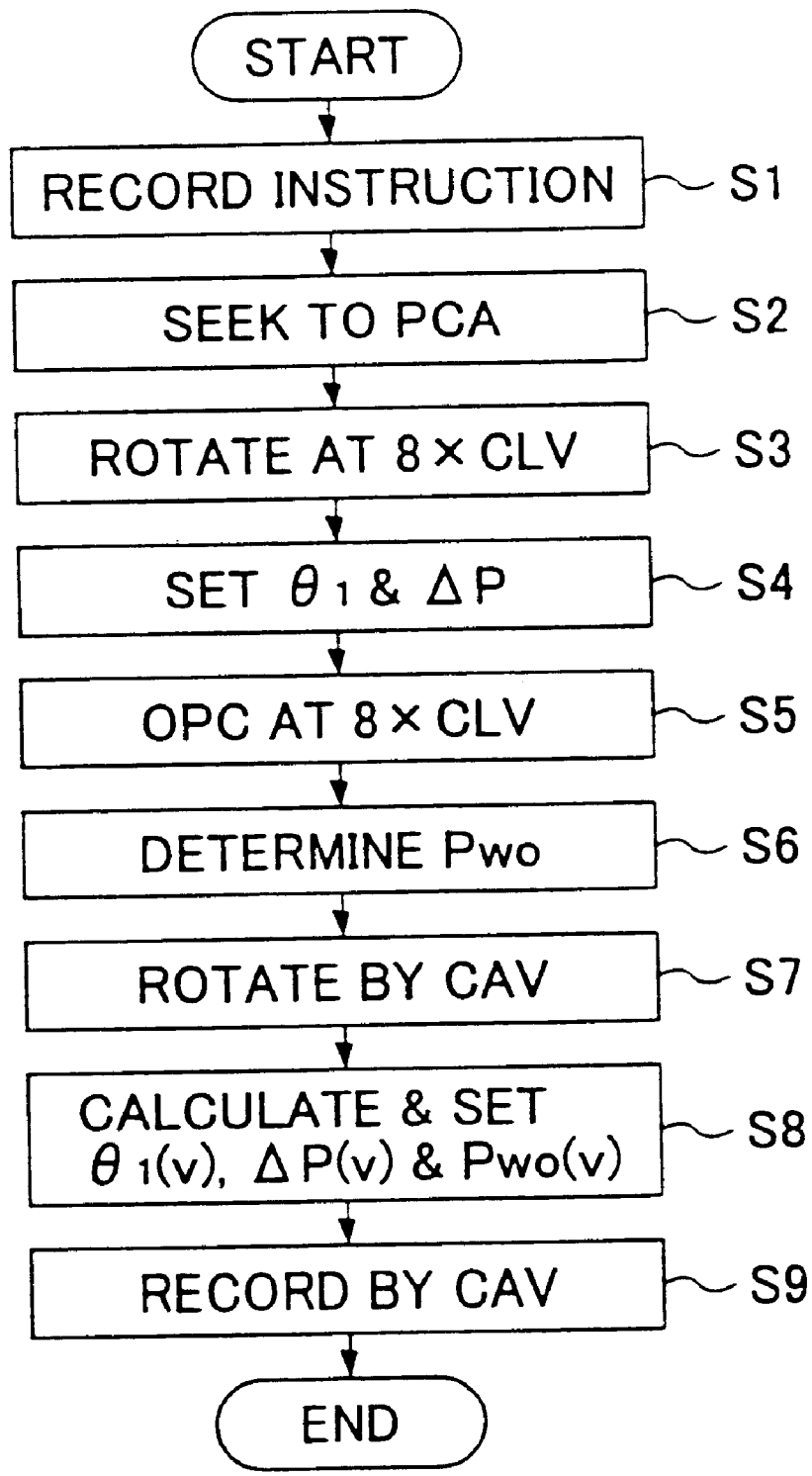
FIG. 6 is a flow chart for generally explaining a recording process of the first embodiment.

First, in FIG. 6, when a step S1 issues a record instruction, a step S2 carries out a seek to a predetermined track which is at a predetermined radial position and is within the PCA 31 allocated to the inner peripheral region of the optical disk 1, by controlling the optical pickup 5 prior to the recording. A step S3 controls the spindle motor 2 to rotate the optical disk 1 at a predetermined linear velocity in conformance with the CLV system. For example, the predetermined linear velocity is v_8×, and the optical disk 1 is rotated at an 8-times speed (8×CLV). In this state, a step S4 sets the optimum power ratio ΔP of the extra pulse and the value θ$_1$ which prescribes the optimum recording pulse width for prescribing the write strategy for the OPC. In other words, the step S4 sets the optimum power ratio ΔP_8× of the extra pulse and the value θ$_1$_8× which prescribes the optimum recording pulse width for the predetermined linear velocity 8×CLV. Such data which are set are prestored in the ROM 18, the non-volatile memory 21 or the like, for example. The process carried out by the step S4 prior to the recording corresponds to the function of the setting means.

In the state where the write strategy is set in this manner, a step S5 carries out the OPC while rotating the optical disk at the predetermined linear velocity 8×CLV That is, the OPC is carried out a predetermined number of times by driving the semiconductor laser at a recording power which differs for each step, while rotating the optical disk 1 by the spindle motor 2 at the predetermined linear velocity 8×CLV, using the optimum power ratio ΔP_8× of the extra pulse and the value θ$_1$_8× which prescribes the optimum recording pulse width for the predetermined linear velocity 8×CLV. The process carried out by the step S5 prior to the recording corresponds to the function of the test write means.

After the OPC ends, a step S6. reproduces the data recorded by the test write of the OPC, and detects characteristic values related to the reproduced data, so as to determine an optimum recording power Pwo based on the characteristic values. In this case, the optimum recording power Pwo is Pwo_8×, and the process carried out by the step S6 corresponds to the function of the reference optimum recording power determination means.

After these processes, the actual recording operation is carried out. More particularly, a step S7 rotates the optical disk 1 by the spindle motor 2 at a predetermined number of revolutions in conformance with the CAV system. The process carried out by the step S7 corresponds to the function of the recording rotation control means.

A step S8 successively calculates and sets a value $\theta_1(v)$ which prescribes the recording pulse width, a power ratio $\Delta P(v)$ and an optimum recording power Pwo(v), depending on an arbitrary linear velocity v at a recording target track which is to be recorded by the optical pickup 5. In many cases, this arbitrary linear velocity v is greater than the linear velocity v_8× for the PCA 31. The calculations are performed by adding corrections dependent on the arbitrary linear velocity v with respect to the value $\theta_1$_8× which prescribes the optimum recording pulse width, the optimum power ratio $\Delta P$_8× of the extra pulse and the optimum recording power Pwo_8× which are set or determined by the process carried out prior to the recording. More particularly, the optimum recording power Pwo(v), the value $\theta_1(v)$ and the power ratio $\Delta P(v)$ are defined by the following continuous functions (1), (2) and (3) of the arbitrary linear velocity v. The process carried out by the step S8 corresponds to the function of the light emission waveform updating computation means.

$$Pwo(v)=Pwo\_8\times*sqrt(v/v\_8\times) \quad (1)$$

$$\theta_1(v)=\theta_1\_8\times*(v\_8\times/v) \quad (2)$$

$$\Delta P(v)=\Delta P\_8\times*(v\_8\times/v) \quad (3)$$

A step S9 carries out the recording operation with respect to the optical disk 1 in conformance with the CAV system, while controlling the light emission waveform (write strategy) of the semiconductor laser via the laser control circuit 16 based on the value $\theta_1(v)$ which prescribes the recording pulse width, the power ratio $\Delta P(v)$ and the optimum recording power Pwo(v) which are successively calculated and updated by the step S8. The process carried out by the step S9 corresponds to the function of the recording light source control means.

Therefore, according to this embodiment, it is possible to improve the recording velocity because the optical disk 1 is basically rotated at the predetermined number of revolutions in conformance with the CAV system during the recording. Furthermore, since the value $\theta_1(v)$ which prescribes the recording pulse width, the power ratio $\Delta P(v)$ and the optimum recording power Pwo(v) are successively calculated, and the recording is carried out while controlling the light emission waveform of the semiconductor laser based on the calculated values, it is possible to always record the information under a stable recording condition in conformance with the CAV system, even if the linear velocity during the recording changes.

Figure 7:
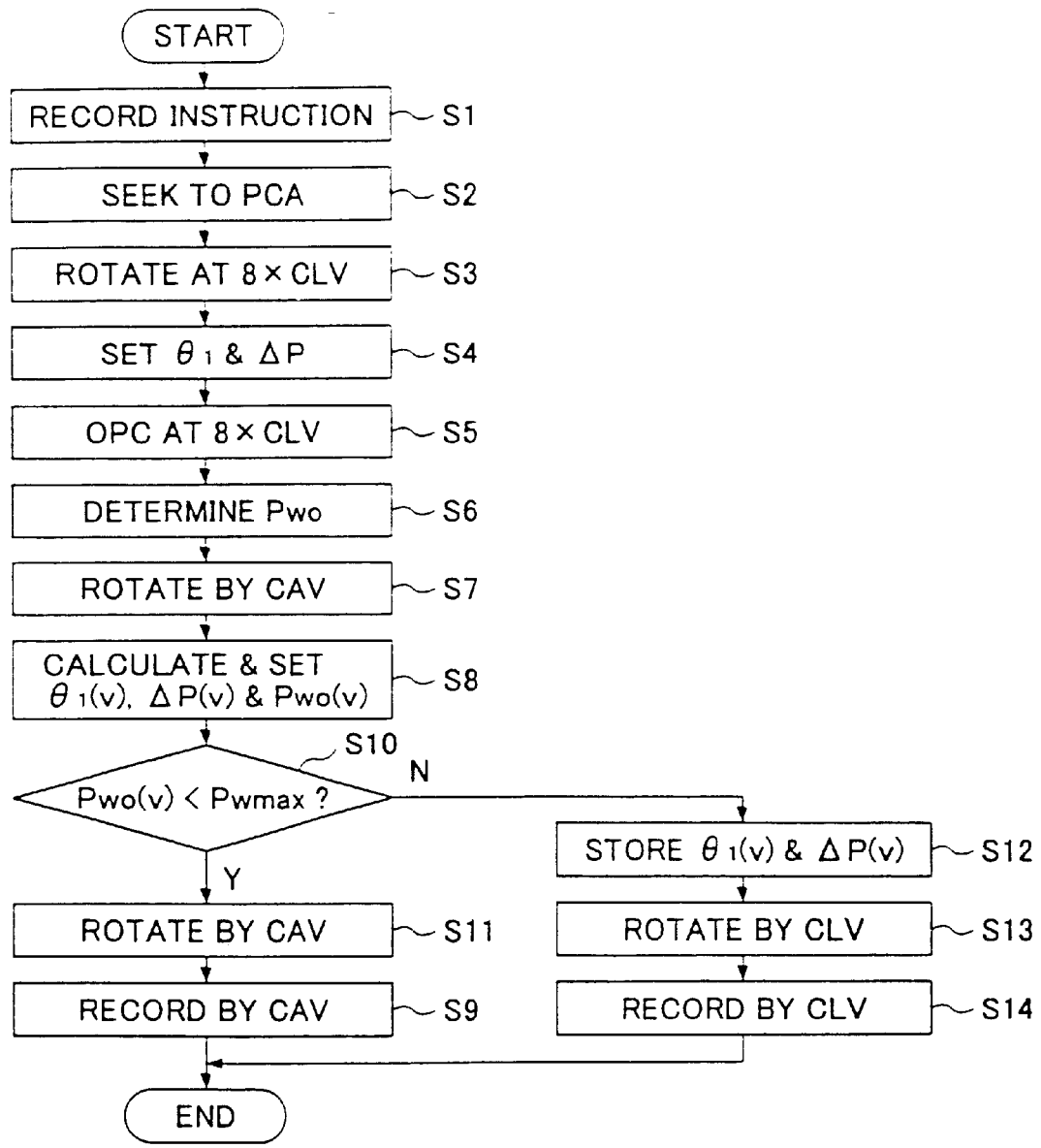
FIG. 7 is a flow chart for explaining a recording process of a second embodiment of the optical disk unit according to the present invention.

Next, a description will be given of a second embodiment of the optical disk unit according to the present invention, by referring to FIG. 7. FIG. 7 is a flow chart for explaining a recording process of this second embodiment of the optical disk unit. In FIG. 7, those steps which are the same as those corresponding steps in FIG. 6 are designated by the same reference numerals, and a description thereof will be omitted.

The general structure of this second embodiment of the optical disk unit, as well as the general structures of third through tenth embodiments of the optical disk unit according to the present invention which will be described later, are the same as the general structure of the first embodiment of the optical disk unit shown in FIG. 4, and a description thereof will be omitted.

In the first embodiment described above, the operation of the optical disk unit is always in conformance with the CAV system while recording the information Accordingly, as the target track moves towards the outer periphery of the optical disk 1, the linear velocity v increases, and the optimum recording power Pwo(v) which is successively calculated also increases For this reason, in a case where the recording sensitivity of the optical disk 1 is low and the optimum recording power Pwo(v) which is originally determined by the OPC is large, the optimum recording power Pwo(v) may exceed a predetermined upper limit, that is, a maximum output Pwmax of the semiconductor laser depending on the position of the track in the outer peripheral region of the optical disk 1. In such a case, the recording cannot be carried out at the optimum recording power Pwo(v).

This second embodiment takes into account such a case. More particularly, during the actual recording operation, a step S10 shown in FIG. 7 decides whether or not the optimum recording power Pwo(v) which is successively calculated is less than the maximum output Pwmax (predetermined upper limit value) of the semiconductor laser. If the decision result in the step S10 is YES, a step S11 rotates the optical disk 1 in conformance with the CAV system, that is, continues the rotation control of the step S7. Then, after the step S11, the step S9 carries out the recording operation with respect to the optical disk 1 in conformance with the CAV system.

On the other hand, if the decision result in the step S10 is NO, a step S12 stores the optimum recording power Pwo(v) (=Pwmax) and the power ratio $\Delta P(v)$ and the value $\theta_1(v)$ which prescribes the recording pulse width in this state, as the write strategy of the semiconductor laser, in order to record on the tracks subsequent to the target track. In addition, a step S13 switches the rotation of the spindle motor 2 to rotate the optical disk 1 at the linear velocity v which becomes constant in this state in conformance with the CLV system. A step 514 carries out the recording operation with respect to the optical disk 1 in conformance with the CLV system while controlling the light emission waveform (write strategy) of the semiconductor laser via the laser control circuit 16, based on the stored optimum recording power Pwo(v) (=Pwmax) and the power ratio $\Delta P(v)$ and the value $\theta_1(v)$ which prescribes the recording pulse width in this state.

The process carried out by the step S10 corresponds to the function of the judging means, and the process carried out by the step S13 corresponds to the function of the recording rotation control means. The process carried out by the step S14 corresponds to the function of the recording light source control means.

According to this embodiment, a decision is made to determine whether or not the optimum recording power Pwo(v) reaches the maximum output Pwmax of the semiconductor laser. The recording is carried out in conformance with the CAV system at the original predetermined number of revolutions in a track region in which the maximum output Pwmax is not exceeded. On the other hand, in a track region in which the maximum output Pwmax is reached or exceeded, the recording is carried out in conformance with the CLV system at the constant linear velocity which introduces no change in the linear velocity v. For this reason, it is possible to continue the recording at the maximum output of the semiconductor laser, and it is thus possible to cope with cases where the semiconductor laser used has a low maximum output for the recording power and the optical disk used has a low recording sensitivity, by a minimum required decrease in the recording velocity.

Figure 8:
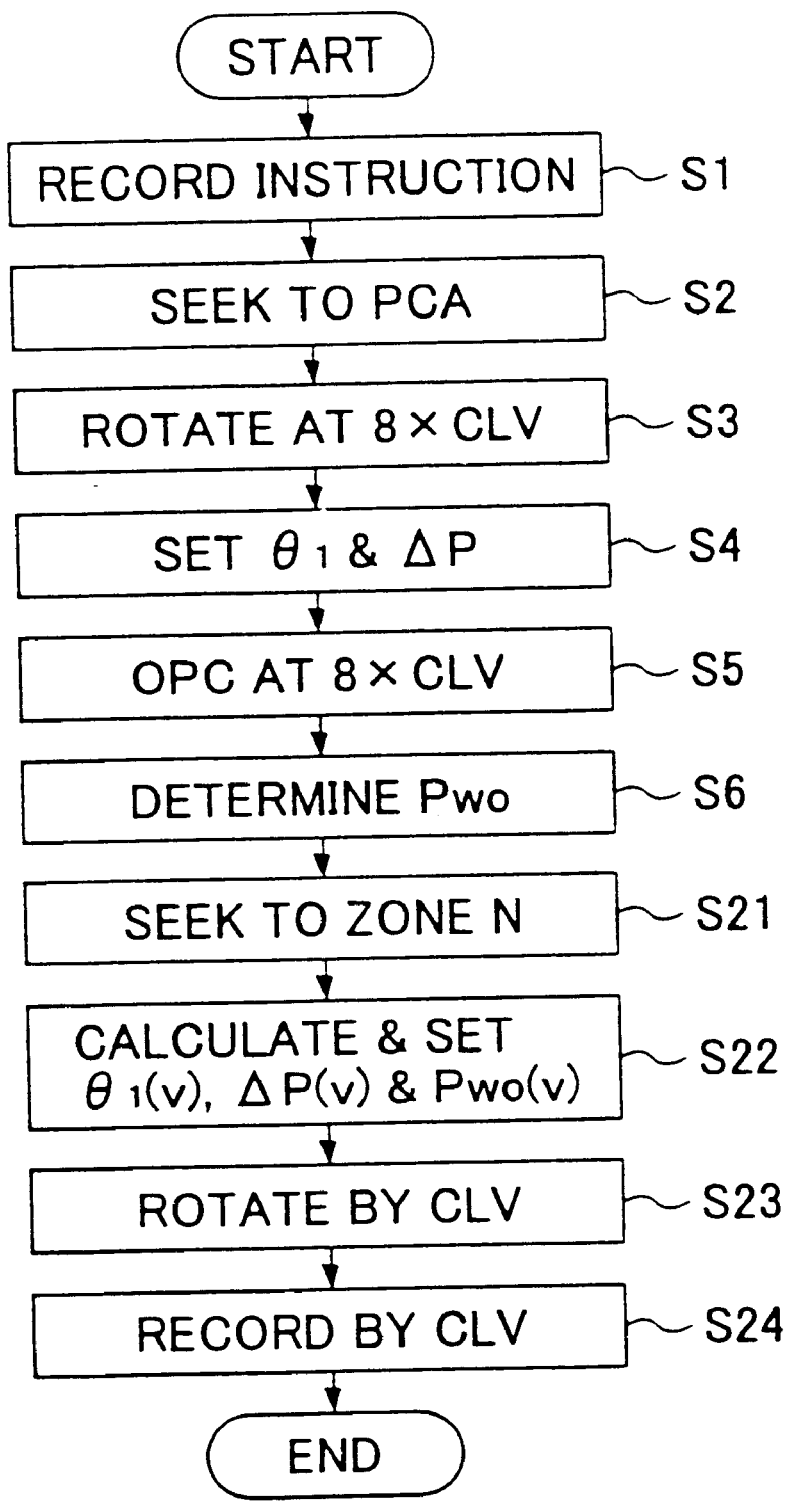
FIG. 8 is a flow chart for explaining a recording process of a third embodiment of the optical disk unit according to the present invention.

Next, a description will be given of a third embodiment of the optical disk unit according to the present invention, by referring to FIG. 8. FIG. 8 is a flow chart for explaining a recording process of this third embodiment of the optical disk unit. In FIG. 8, those steps which are the same as those corresponding steps in FIG. 6 are designated by the same reference numerals, and a description thereof will be omitted.

This third embodiment is similar to the first embodiment, except that this third embodiment rotates the optical disk 1 in conformance with the ZCLV system in place of the CAV system during the recording. For example, the recording surface of the optical disk 1 is divided into N=4 zones in the radial direction, and the recording is carried out by rotating the optical disk 1 in conformance with the CLV system so that that the rotational velocity (linear velocity) successively differs for each of the zones from the inner periphery towards the outer periphery, as 8×, 12×, 16× and 20×.

The processes carried out by the steps S1 through S6 prior to the recording in this third embodiment which employs the ZCLV system, are the same as those carried but in the first embodiment. In other words, the processes such as determination of the optimum recording power Pwo by the OPC are carried out once using the PCA 31.

When the processes carried out prior to the recording end, a step S21 shown in FIG. 8 carries out a seek to a recording target zone N of the optical disk 1 by moving the optical pickup 5, so as to start the recording operation. A step S22 successively calculates and sets the value $\theta_1(v)$ which prescribes the recording pulse width, the power ratio $\Delta P(v)$ and the optimum recording power Pwo(v), depending on the arbitrary linear velocity v related to the recording target zone N which is to be recorded by the optical pickup 5. The calculations are performed by adding corrections dependent on the arbitrary linear velocity v with respect to the value $\theta_1\_8\times$ which prescribes the optimum recording pulse width, the optimum power ratio $\Delta P\_8\times$ of the extra pulse and the optimum recording power Pwo\_8× which are set or determined by the process carried out prior to the recording. More particularly, the optimum recording power Pwo(v), the value $\theta_1(v)$ and the power ratio $\Delta P(v)$ are defined by the continuous functions (1), (2) and (3) of the arbitrary linear velocity v described above. The process carried out by the step S22 corresponds to the function of the light emission waveform updating computation means.

A step S23 rotates the optical disk 1 by the spindle motor 2 in conformance with the CLV system so that the linear velocity v becomes the predetermined linear velocity for the zone N. The process carried out by the step S23 corresponds to the function of the recording rotation control means.

A step S24 carries out the recording operation with respect to the optical disk 1 in conformance with the CLV system, while controlling the light emission waveform (write strategy) of the semiconductor laser via the laser control circuit 16 based on the value $\theta_1(v)$ which prescribes the recording pulse width, the power ratio $\Delta P(v)$ and the optimum recording power Pwo(v) which are successively calculated and updated by the step S22. The process carried out by the step S24 corresponds to the function of the recording light source control means.

When carrying out the recording by rotating the optical disk 1 in conformance with the ZCLV system, if the process of the first embodiment were carried out with respect to each zone, it would be necessary to set the value $\theta_1$ which prescribes the optimum recording pulse width and the power ratio $\Delta P$ for each of the linear velocities amounting to the number N of zones, and to determine the optimum recording power Pwo by the OPC. But according to this third embodiment, the setting of the value $\theta_1$ which prescribes the optimum recording pulse width and the power ratio $\Delta P$ and the determination of the optimum recording power Pwo only need to be carried out once based on the PCA 31 which has the predetermined radial position and in which the linear velocity is the predetermined linear velocity 8×. Thereafter, the value $\theta_1(v)$ which prescribes the recording pulse width, the power ratio $\Delta P(v)$ and the optimum recording power Pwo(v) can be successively calculated and set depending on the linear velocity v of the target recording zone, so that it is possible to always record the information under a stable recording condition, even with respect to the ZCLV system.

Figure 9:
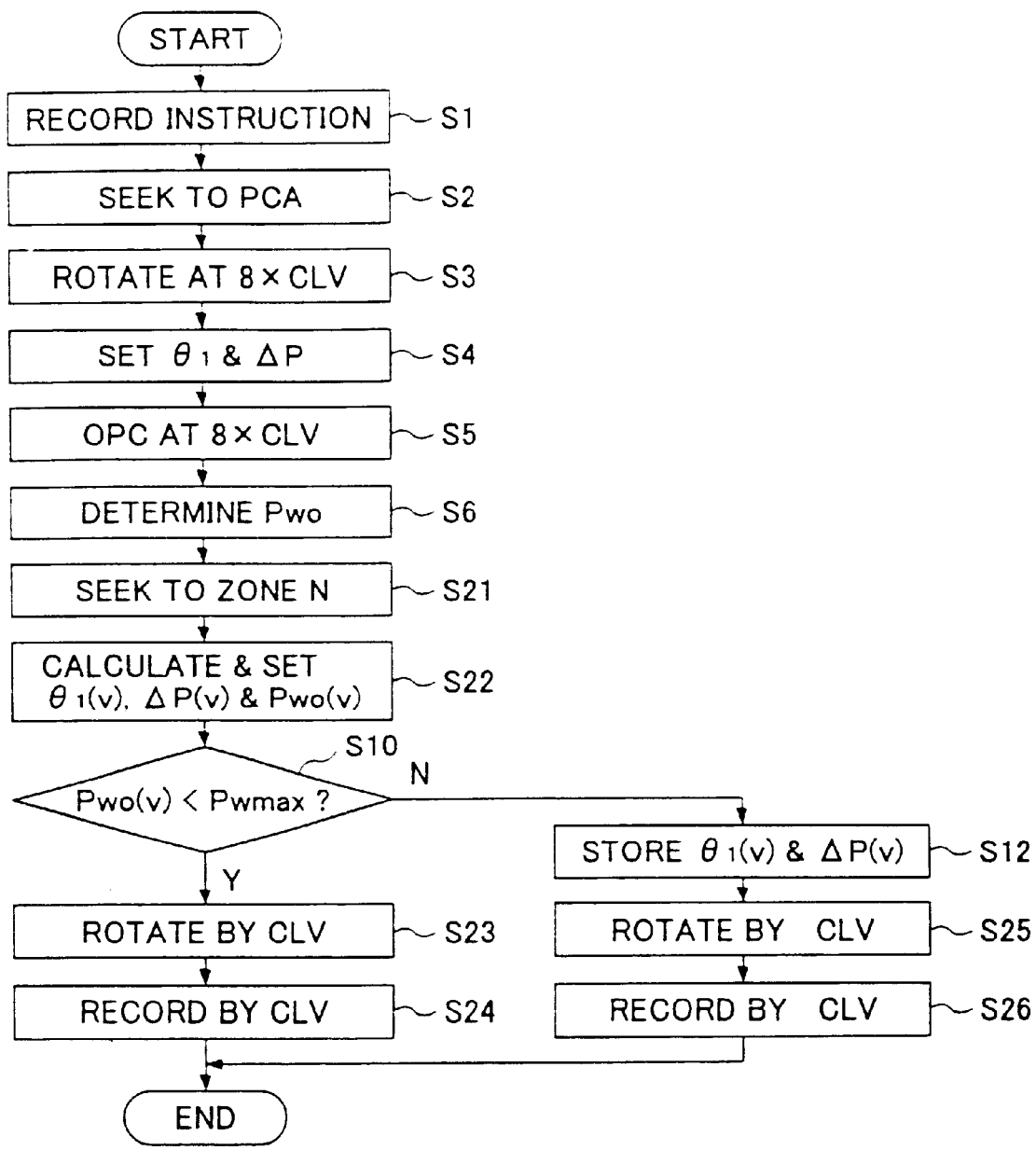
FIG. 9 is a flow chart for explaining a recording process of a fourth embodiment of the optical disk unit according to the present invention.

Next, a description will be given of a fourth embodiment of the optical disk unit according to the present invention, by referring to FIG. 9. FIG. 9 is a flow chart for explaining a recording process of this fourth embodiment of the optical disk unit. In FIG. 9, those steps which are the same as those corresponding steps in FIGS. 6 through 8 are designated by the same reference numerals, and a description thereof will be omitted.

In the third embodiment described above, the optimum recording power Pwo(v) calculated based on the continuous function (1) described above with respect to the recording zone in which the linear velocity is 20×CLV, for example, may exceed the maximum output Pwmax (predetermined upper limit value) of the semiconductor laser. In other words, it may not be possible to record at the optimum recording power Pwo(v) in such a case.

This fourth embodiment takes such a case into consideration. More particularly, during the actual recording operation, the step S10 shown in FIG. 9 decides whether or not the optimum recording power Pwo(v) which is successively calculated is less than the maximum output Pwmax (predetermined upper limit value) of the semiconductor laser. If the decision result in the step S10 is YES, the step S23 rotates the optical disk 1 in conformance with the ZCLV system, and the step S24 carries out the recording operation with respect to the optical disk 1 in conformance with the CLV system within the zone.

On the other hand, if the decision result in the step S10 is NO, the step S12 stores the optimum recording power Pwo(v) (=Pwmax) and the power ratio $\Delta P(v)$ and the value $\theta_1(v)$ which prescribes the recording pulse width in this state, as the write strategy of the semiconductor laser, in order to record on the zones subsequent to the recording target zone. In addition, a step S25 switches the rotation of the spindle motor 2 to rotate the optical disk 1 at the linear velocity v which becomes constant in this state in conformance with the CLV system. A step S26 carries out the recording operation with respect to the optical disk 1 in conformance with the CLV system while controlling the light emission waveform (write strategy) of the semiconductor laser via the laser control circuit 16, based on the stored optimum recording power Pwo(v) (=Pwmax) and the power ratio $\Delta P(v)$ and the value $\theta_1(v)$ which prescribes the recording pulse width in this state.

For example, if the optimum recording power Pwo(v) for the linear velocity 16×CLV becomes the maximum output Pwmax of the semiconductor laser, the recording operation with respect to the recording zone in which the linear velocity is 20×CLV is carried out by switching the linear velocity to 16×CLV in the step S25. In addition, the optimum recording power Pwo(v) is set to the maximum output Pwmax, and the power ratio ΔP(v) and the value $\theta_1(v)$ which prescribes the recording pulse width for the linear velocity 16×CLV are set in the step S12. Furthermore, the recording operation is carried out in conformance with the CLV system by the steps S25 and S26.

The process carried out by the step S10 corresponds to the function of the judging means, and the process carried out by the step S25 corresponds to the function of the recording rotation control means. The process carried out by the step S26 corresponds to the function of the recording light source control means.

Therefore, according to this embodiment, a decision is made to determine whether or not the optimum recording power Pwo(v) reaches the maximum output Pwmax of the semiconductor laser. The recording is carried out in conformance with the CLV system at the original predetermined linear velocity in a recording zone region in which the maximum output Pwmax is not exceeded. On the other hand, in a recording zone region in which the maximum output Pwmax is reached or exceeded, the recording is carried out in conformance with the ZCLV system at the constant linear velocity which introduces no change in the linear velocity v within each recording zone. For this reason, it is possible to continue the recording at the maximum output of the semiconductor laser, and it is thus possible to cope with cases where the semiconductor laser used has a low maximum output for the recording power and the optical disk used has a low recording sensitivity, by a minimum required decrease in the recording velocity.

Figure 10:
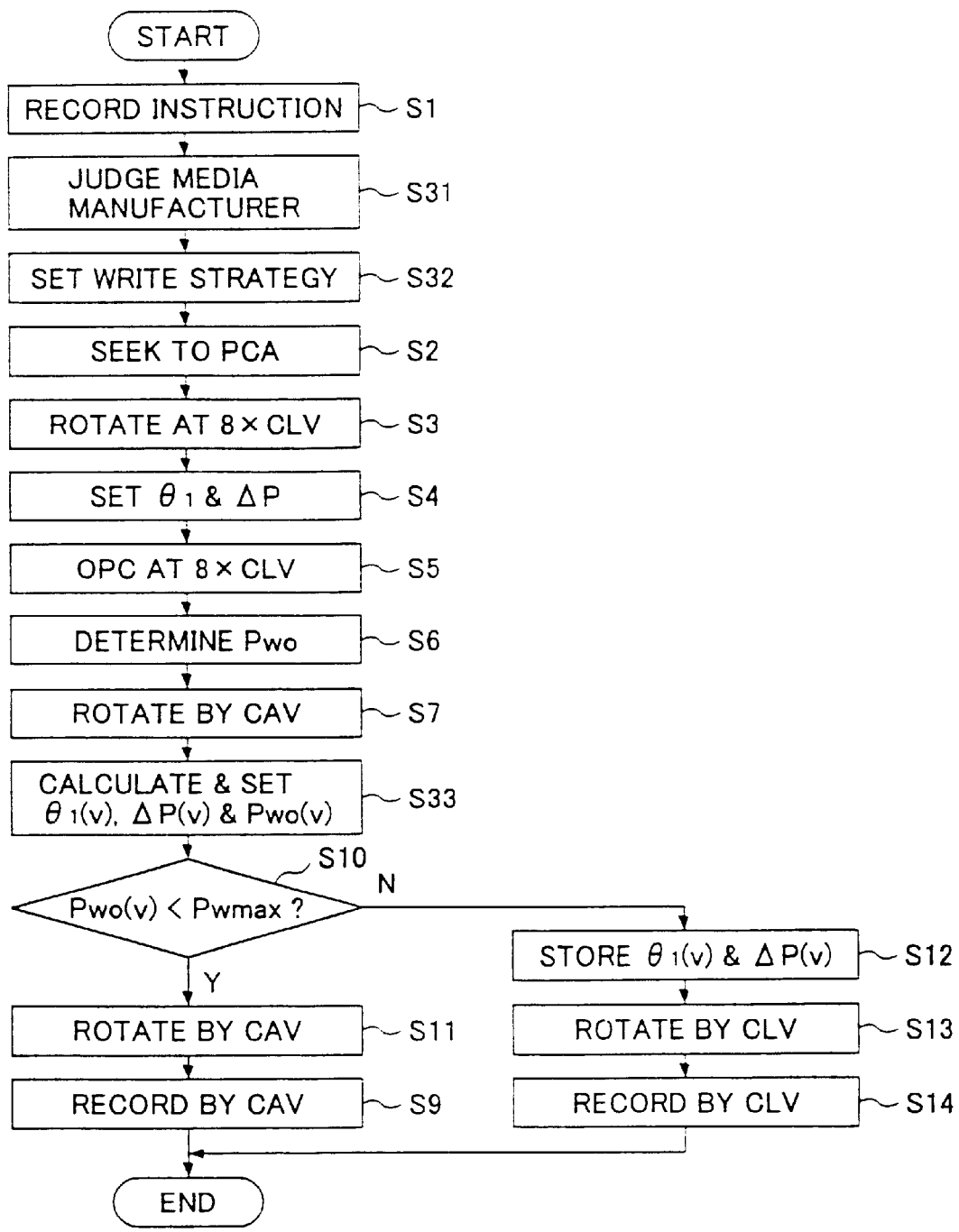
FIG. 10 is a flow chart for explaining a recording process of a fifth embodiment of the optical disk unit according to the present invention.

Next, a description will be given of a fifth embodiment of the optical disk unit according to the present invention, by referring to FIG. 10. FIG. 10 is a flow chart for explaining a recording process of this fifth embodiment of the optical disk unit. In FIG. 10, those steps which are the same as those corresponding steps in FIG. 7 are designated by the same reference numerals, and a description thereof will be omitted.

This fifth embodiment takes into consideration a manufacturer of the optical disk 1. Further, it is assumed for the sake of convenience that the manufacturer of the optical disk 1 is taken into consideration when using the second embodiment described above. Predetermined coefficients, optimum write strategies and the like which differ for each manufacturer are prestored in a memory such as the ROM 18 and the non-volatile memory 21 or, are successively updated and stored in the memory.

Under these preconditions, when the optical disk 1 is loaded into the optical disk unit, a step S31 shown in FIG. 10 identifies a manufacture code recorded on the optical disk 1 to judge the media manufacturer. Normally, in the case of the optical disk 1 such as the CD-R, a lead-in-start-time recorded in the ATIP of the optical disk 1 differs for each media manufacturer, and thus, the media manufacturer can be judged by reading this lead-in-start-time. The process carried out by the step S31 corresponds to the function of a manufacturer judging means.

After the media manufacturer is judged, a step S32 sets a write strategy corresponding to the judged media manufacturer, by reading the write strategy from a write strategy table which stores write strategies of various media manufacturers, optimized for a predetermined linear velocity. After the step S32, the process advances to the step S2 and the subsequent steps of the second embodiment described above.

When carrying out the successively updating and calculating process for the actual recording operation, a step S33 is carried out in place of the step S8. Basically, the step S33 is similar to the step S8, but differs in that the calculation is made using coefficients which are different for each media manufacturer. In other words, the step S33 performs the calculations by adding corrections dependent on the arbitrary linear velocity v and predetermined coefficients a through f which differ for each media manufacturer, with respect to the value $\theta_{1\_8\times}$ which prescribes the optimum recording pulse width, the optimum power ratio $\Delta P\_8\times$ of the extra pulse and the optimum recording power $Pwo\_8\times$ which are set or determined by the process carried out prior to the recording. More particularly, the optimum recording power Pwo(v), the value $\theta_1(v)$ and the power ratio ΔP(v) are defined by the following continuous functions (4), (5) and (6) of the arbitrary linear velocity v The process carried out by the step S33 corresponds to the function of the light emission waveform updating computation means.

$$Pwo(v)=Pwo\_8\times*sqrt\{(v/v\_8\times)*a+b\} \quad (4)$$

$$\theta_1(v)=\theta_1\_8\times*\{(v\_8\times/v)*c+d\} \quad (5)$$

$$\Delta P(v)=\Delta P\_8\times*\{(v\_8\times/v)*e+f\} \quad (6)$$

In each of the first through fourth embodiments described above, such as the second embodiment, for example, it may not be possible to always record the information under the optimum recording condition depending on media manufacturer of the optical disk 1 used due to differences which exist among the media manufacturers, if the value $\theta_1(v)$ which prescribes the recording pulse width, the power ratio ΔP(v) and the optimum recording power Pwo(v) depending on the linear velocity v are calculated and set in the same manner for all media manufacturers of the optical disk 1. But according to this fifth embodiment, the media manufacturer of the optical disk 1 used is judged based on the identification code prerecorded on the optical disk 1, and the value $\theta_1(v)$ which prescribes the recording pulse width, the power ratio ΔP(v) and the optimum recording power Pwo(v) are respectively calculated by taking into consideration the coefficients a through f of the judged media manufacturer. The coefficients a through f are preset for each of the media manufacturers. As a result, it is possible to appropriately cope with the differences among the media manufacturers of the optical disk 1 which is used by the optical disk unit.

In this embodiment, even with respect to the same media manufacturer, the type of the optical disk 1 used may differ depending on the case. For example, the same media manufacturer may manufacture cyanin type optical disks and phthalocyanine type optical disks. In such a case where different types of optical disks of the same media manufacturer may be used in the optical disk unit, the information may not always be recorded under the appropriate recording condition. In such a case, the step S31 identifies a type code read from the optical disk 1, in addition to identifying the manufacture code of the optical disk 1. As a result, it is possible to judge the media manufacturer of the optical disk 1 and the type of the optical disk 1.

Normally, in the case of the optical disk 1 such as the CD-R, the type code is indicated by a first digit of a frame of the lead-in-start-time recorded in the ATIP, and the cyanin type optical disk is indicated when the type code is 0–4, and the phthalocyanine type optical disk is indicated when the type code is 5–9. In other words, it is possible to identify whether the type of the optical disk 1 is the cyanin type or the phthalocyanine type. Accordingly, if the lead-in-starttime is 97m27s60f, it can be judged that the optical disk 1 is the cyanin type. The step S33 in this case takes into consideration the different types of the optical disk 1, and performs the calculations by adding corrections dependent on the arbitrary linear velocity v with respect to the value $\theta_1\_8\times$ which prescribes the optimum recording pulse width, the optimum power ratio $\Delta P\_8\times$ of the extra pulse and the optimum recording power $Pwo\_8\times$ which are set or determined by the process carried out prior to the recording. More particularly, the optimum recording power Pwo(v), the value $\theta_1(v)$ and the power ratio $\Delta P(v)$ are defined by the following continuous functions (7), (8) and (9) of the arbitrary linear velocity v, where coefficients $\epsilon$, $\eta$ and $\epsilon$ differ depending on the type of the optical disk 1 and may be prestored in a memory such as the ROM 18 and the non-volatile memory 21.

$$Pwo(v)=Pwo\_8\times*sqrt\{(v/v\_8\times)*a*\epsilon+b\} \quad (7)$$

$$\theta_1(v)=\theta_1\_8\times*\{(v\_8\times/v)*c*\eta+d\} \quad (8)$$

$$\Delta P(v)=\Delta P\_8\times*\{(v\_8\times/v)*e*\delta+f\} \quad (9)$$

Therefore, according to this fifth embodiment which also judges the type of the optical disk 1, the value $\theta_1(v)$ which prescribes the recording pulse width, the power ratio $\Delta P(v)$ and the optimum recording power Pwo(v) are calculated by taking into consideration the values which are obtained by multiplying the coefficients $\epsilon$, $\eta$ and $\delta$ which differ depending on the type of the optical disk 1 with respect to the corresponding coefficients $\underline{a}$, c and e which are preset for each judged media manufacturer. Consequently, it is possible to appropriately cope with optical disks 1 manufactured by different media manufacturers as well as different type of optical disks 1.

Figure 11:
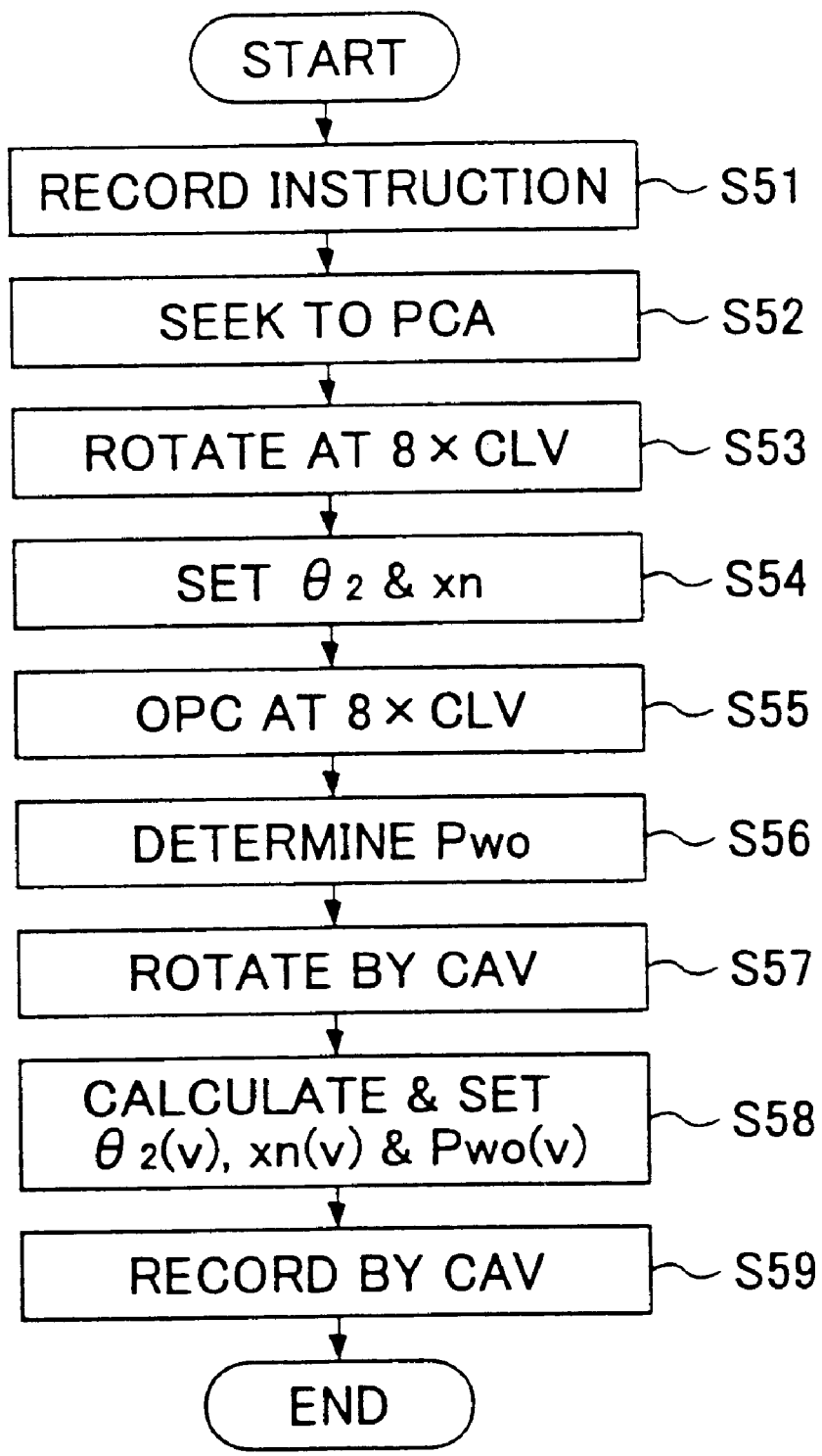
FIG. 11 is a flow chart for explaining a recording process of a sixth embodiment of the optical disk unit according to the present invention.

Next, a description will be given of a sixth embodiment of the optical disk unit according to the present invention, by referring to FIG. 11. FIG. 11 is a flow chart for explaining a recording process of this sixth embodiment of the optical disk unit. This sixth embodiment of the optical disk unit uses a rewritable optical disk 1, such as the CD-RW.

For example, as indicated in the Orange Book Part III, the OPC of the rewritable optical disk 1 such as the CD-RW obtains a modulation factor m which is given by the following formula (10) while changing the laser power of the semiconductor laser in multi-steps, where pk and bt respectively denote a peak and a bottom of the read signal amplitude, and further obtains a normalized slope $\gamma$ which is given by the following formula (11) based on the modulation factor m and the recording power characteristic. The OPC is carried out by obtaining a recording (write) power Pw at which the normalized slope $\gamma$ becomes $\gamma=\gamma t$, where $\gamma t$ is a predetermined value which is peculiar to the optical disk 1.

$$m=(pk-bt)/pk \quad (10)$$

$$\gamma=(\Delta m/\Delta pw)*(Pw/m) \quad (11)$$

In addition, instead of using the recording power Pw as it is as the optimum recording power, it is preferable in some cases to multiply a constant $\rho$ which is peculiar to the optical disk 1 to the recording power Pw and to actually use $Pw*\rho$ as the optimum recording power.

Figure 3:
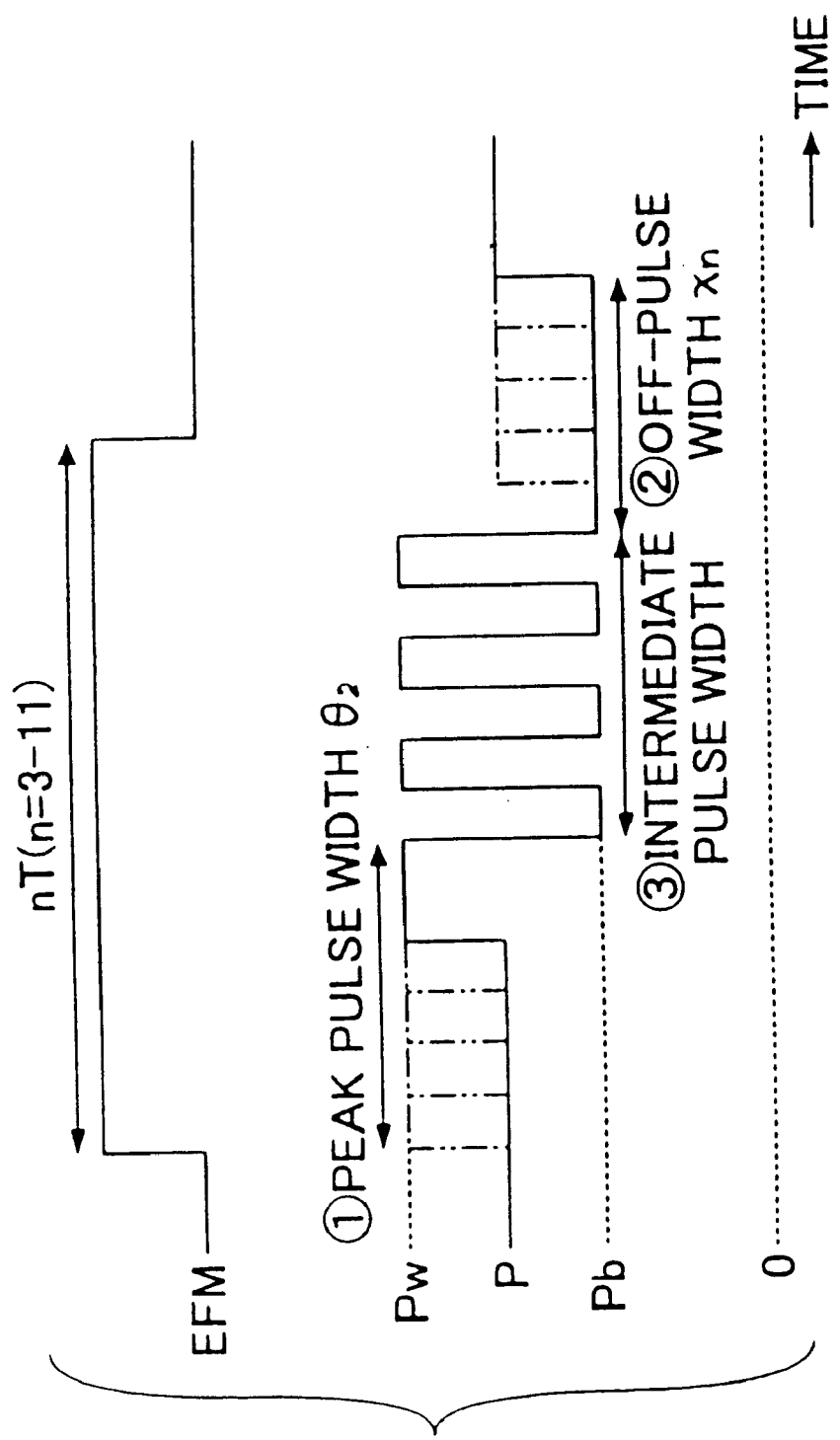
FIG. 3 is a timing chart for explaining a write strategy for a CD-RW.

On the other hand, the write strategy with respect to the optical disk 1, that is, the CD-RW, uses multi-recording pulses as shown in FIG. 3 described above, including a peak pulse width $\theta_2$ and an OFF-pulse width xn.

Under the preconditions described above, when the rewritable optical disk 1 is loaded into the optical disk unit of this embodiment and a record (write) instruction is received from the host computer, the CPU 17 carries out the functions of a setting means, a test write means, a reference optimum recording power determination means, a recording rotation control means, a light emission waveform updating computation means, and a recording light source control means. FIG. 11 is a flow chart for generally explaining a recording process of this sixth embodiment.

First, in FIG. 11, when a step S51 issues a record instruction, a step S52 carries out a seek to a predetermined track which is at a predetermined radial position and is within the PCA 31 allocated to the inner peripheral region of the optical disk 1, by controlling the optical pickup 5 prior to the recording. A step S53 controls the spindle motor 2 to rotate the optical disk 1 at a predetermined linear velocity in conformance with the CLV system. For example, the predetermined linear velocity is $v\_8\times$, and the optical disk 1 is rotated at an 8-times speed (8×CLV). In this state, a step S54 sets the peak pulse width $\theta_2$ and the OFF-pulse width xn for prescribing the write strategy for the OPC. In other words, the step S54 sets the optimum peak pulse width $\theta_2\_8\times$ and the OFF-pulse width $xn\_8\times$ for the predetermined linear velocity 8×CLV. Such data which are set are prestored in the ROM 18, the non-volatile memory 21 or the like, for example. The process carried out by the step S54 prior to the recording corresponds to the function of the setting means.

In the state where the write strategy is set in this manner, a step S55 carries out the OPC while rotating the optical disk at the predetermined linear velocity 8×CLV. That is, the OPC is carried out a predetermined number of times by driving the semiconductor laser at a recording power which differs for each step, while rotating the optical disk 1 by the spindle motor 2 at .the predetermined linear velocity 8×CLV, using the optimum peak pulse width $\theta_2\_8\times$ and the OFF-pulse width $xn\_8\times$ for the predetermined linear velocity 8×CLV. The process carried out by the step S55 prior to the recording corresponds to the function of the test write means.

After the OPC ends, a step S56 reproduces the data recorded by the test write of the OPC, and detects characteristic values related to the reproduced data, so as to determine an optimum recording power Pwo based on the characteristic values. In this case, the optimum recording power Pwo is $Pwo\_8\times$, and the process carried out by the step S56 corresponds to the function of the reference optimum recording power determination means.

After these processes, the actual recording operation is carried out. More particularly, a step S57 rotates the optical disk 1 by the spindle motor 2 at a predetermined number of revolutions in conformance with the CAV system. The process carried out by the step S57 corresponds to the function of the recording rotation control means.

A step S58 successively calculates and sets a peak pulse width $\theta_2(v)$, an OFF-pulse width xn(v) and an optimum recording power Pwo(v), depending on an arbitrary linear velocity v at a recording target track which is to be recorded by the optical pickup 5. In many cases, this arbitrary linear velocity v is greater than the linear velocity $v\_8\times$ for the PCA 31. The calculations are performed by adding corrections dependent on the arbitrary linear velocity v with respect to the optimum peak pulse width $\theta_2\_8\times$, the optimum OFF-pulse width $xn\_8\times$ and the optimum recording power $Pwo\_8\times$ which are set or determined by the process carried out prior to the recording. More particularly, the optimum recording power Pwo(v), the peak pulse width $\theta_2(v)$ and the OFF-pulse width xn(v) are defined by the following continuous functions (12), (13) and (14) of the arbitrary linear velocity v. The process carried out by the step S58 corresponds to the function of the light emission waveform updating computation means.

$$Pwo(v)=Pwo\_8\times *sqrt(v/v\_8\times) \quad (12)$$

$$\theta_2(v)=\theta_2\_8\times *(v\_8\times/v) \quad (13)$$

$$xn(v)=xn\_8\times *(v\_8\times/v) \quad (14)$$

A step S59 carries out the recording operation with respect to the optical disk 1 in conformance with the CAV system, while controlling the light emission waveform (write strategy) of the semiconductor laser via the laser control circuit 16 based on the peak pulse width $\theta_2(v)$, the OFF-pulse width xn(v) and the optimum recording power Pwo(v) which are successively calculated and updated by the step S58. The process carried out by the step S59 corresponds to the function of the recording light source control means.

Therefore, according to this embodiment, it is possible to improve the recording velocity because the optical disk 1 is basically rotated at the predetermined number of revolutions in conformance with the CAV system during the recording. Furthermore, since the peak pulse width $\theta_2(v)$, the OFF-pulse width xn(v) and the optimum recording power Pwo(v) are successively calculated, and the recording is carried out while controlling the light emission waveform of the semiconductor laser based on the calculated values, it is possible to always record the information under a stable recording condition in conformance with the CAV system, even if the linear velocity during the recording changes.

Figure 12:
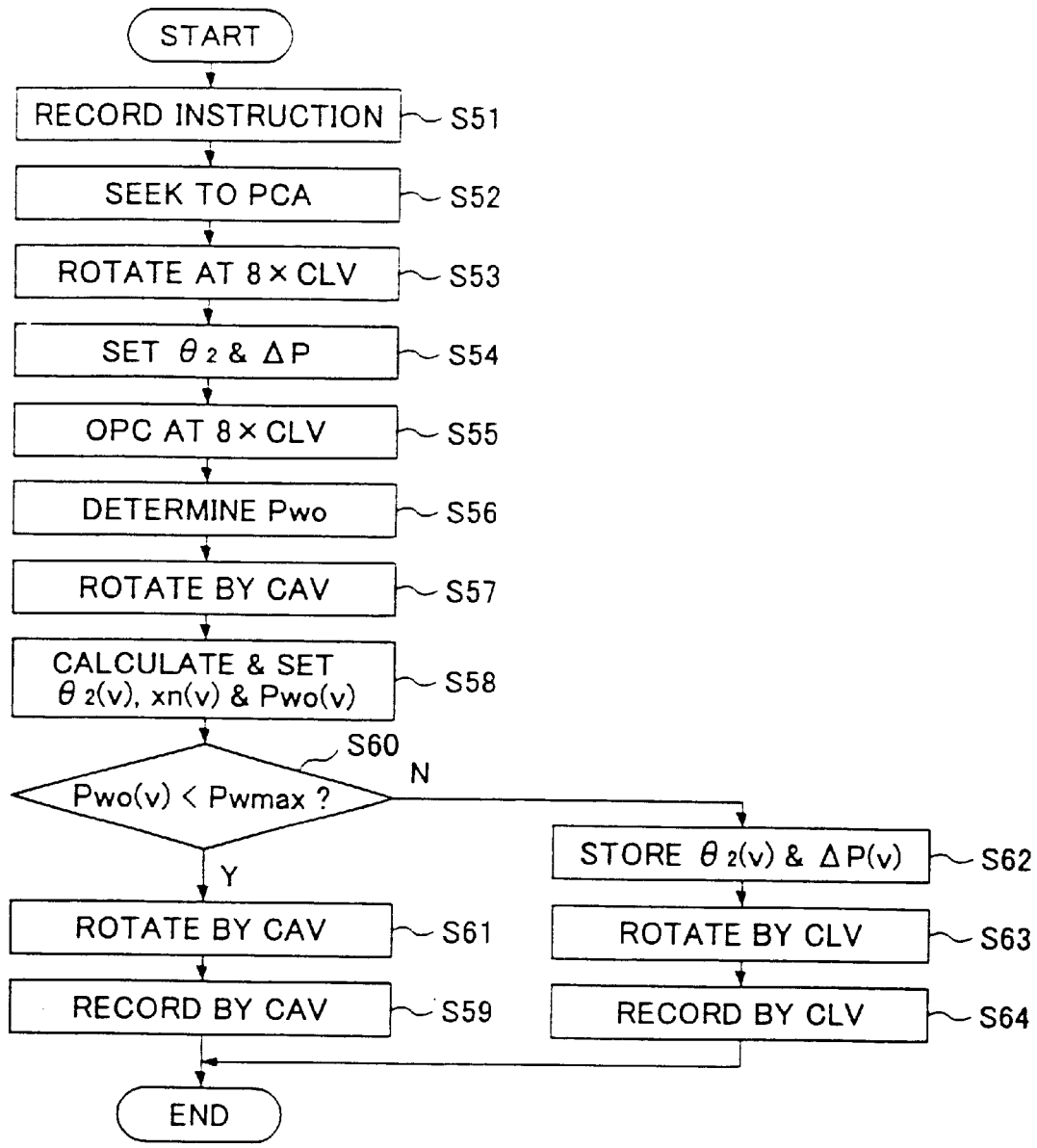
FIG. 12 is a flow chart for explaining a recording process of a seventh embodiment of the optical disk unit according to the present invention.

Next, a description will be given of a seventh embodiment of the optical disk unit according to the present invention, by referring to FIG. 12. FIG. 12 is a flow chart for explaining a recording process of this seventh embodiment of the optical disk unit. In FIG. 12, those steps which are the same as those corresponding steps in FIG. 11 are designated by the same reference numerals, and a description thereof will be omitted.

In the sixth embodiment described above, the operation of the optical disk unit is always in conformance with the CAV system while recording the information. Accordingly, as the target track moves towards the outer periphery of the optical disk 1, the linear velocity v increases, and the optimum recording power Pwo(v) which is successively calculated also increases. For this reason, in a case where the recording sensitivity of the optical disk 1 is low and the optimum recording power Pwo(v) which is originally determined by the OPC is large, the optimum recording power Pwo(v) may exceed a predetermined upper limit, that is, a maximum output Pwmax of the semiconductor laser depending on the position of the track in the outer peripheral region of the optical disk 1. In such a case, the recording cannot be carried out at the optimum recording power Pwo(v).

This seventh embodiment takes into account such a case. More particularly, during the actual recording operation, a step S60 shown in FIG. 12 decides whether or not the optimum recording power Pwo(v) which is successively calculated is less than the maximum output Pwmax (predetermined upper limit value) of the semiconductor laser. If the decision result in the step S60 is YES, a step S61 rotates the optical disk 1 in conformance with the CAV system, that is, continues the rotation control of the step S57. Then, after the step S61, the step S59 carries out the recording operation with respect to the optical disk 1 in conformance with the CAV system.

On the other hand, if the decision result in the step S60 is NO, a step S62 stores the optimum recording power Pwo(v) (=Pwmax) and the peak pulse width $\theta_2(v)$ and the OFF-pulse width xn(v) in this state, as the write strategy of the semiconductor laser, in order to record on the tracks subsequent to the target track. In addition, a step S63 switches the rotation of the spindle motor 2 to rotate the optical disk 1 at the linear velocity v which becomes constant in this state in conformance with the CLV system. A step S64 carries out the recording operation with respect to the optical disk 1 in conformance with the CLV system while controlling the light emission waveform (write strategy) of the semiconductor laser via the laser control circuit 16, based on the stored optimum recording power Pwo(v) (=Pwmax) and the peak pulse width $\theta_2(v)$ and the OFF-pulse width xn(v) in this state.

The process carried out by the step S60 corresponds to the function of the judging means, and the process carried out by the step S63 corresponds to the function of the recording rotation control means. The process carried out by the step S64 corresponds to the function of the recording light source control means.

According to this embodiment, a decision is made to determine whether or not the optimum recording power Pwo(v) reaches the maximum output Pwmax of the semiconductor laser. The recording is carried out in conformance with the CAV system at the original predetermined number of revolutions in a track region in which the maximum output Pwmax is not exceeded. On the other hand, in a track region in which the maximum output Pwmax is reached or exceeded, the recording is carried out in conformance with the CLV system at the constant linear velocity which introduces no change in the linear velocity v. For this reason, it is possible to continue the recording at the maximum output of the semiconductor laser, and it is thus possible to cope with cases where the semiconductor laser used has a low maximum output for the recording power and the optical disk used has a low recording sensitivity, by a minimum required decrease in the recording velocity.

Figure 13:
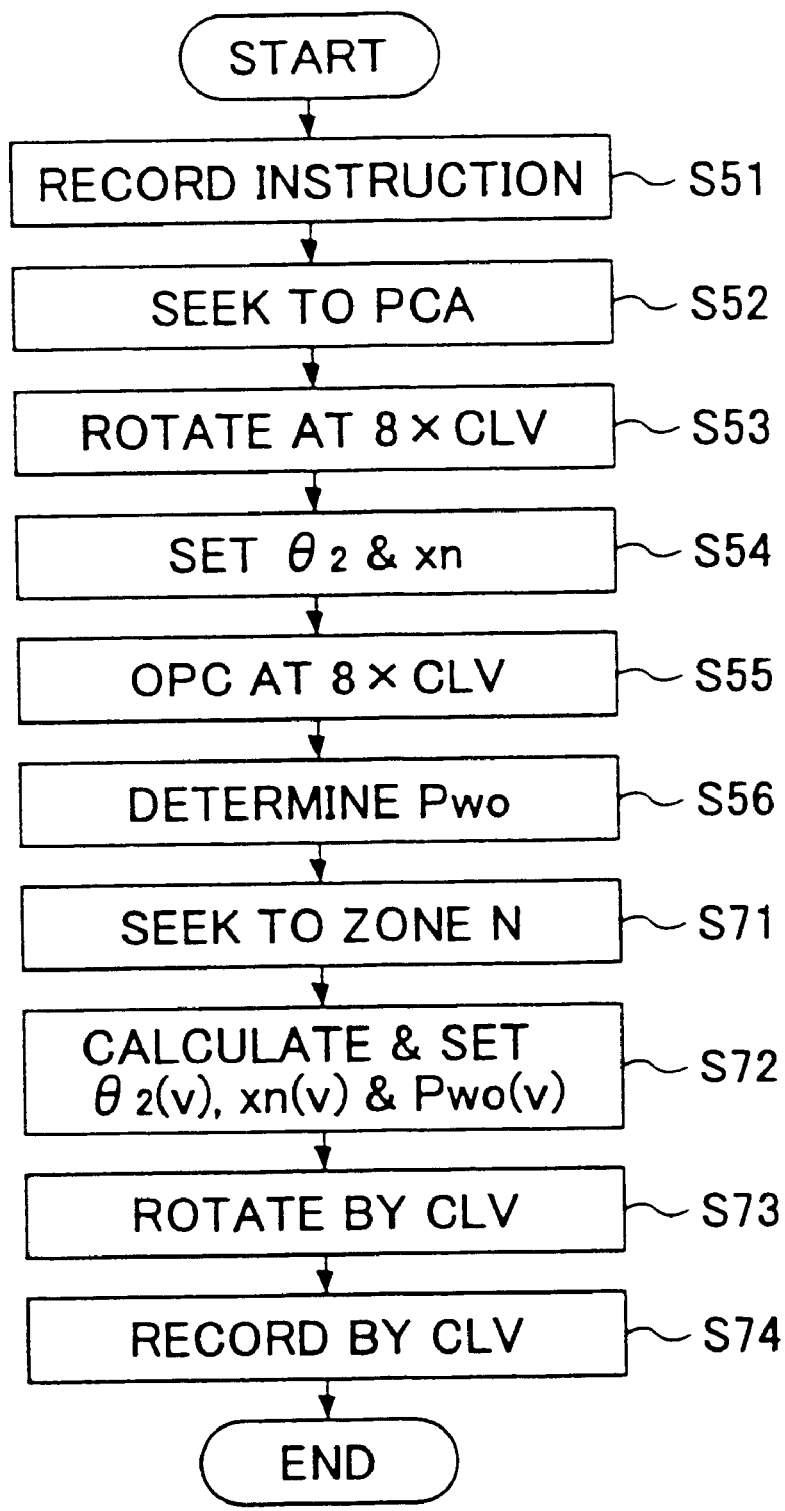
FIG. 13 is a flow chart for explaining a recording process of an eighth embodiment of the optical disk unit according to the present invention.

Next, a description will be given of an eighth embodiment of the optical disk unit according to the present invention, by referring to FIG. 13. FIG. 13 is a flow chart for explaining a recording process of this eighth embodiment of the optical disk unit. In FIG. 13, those steps which are the same as those corresponding steps in FIG. 11 are designated by the same reference numerals, and a description thereof will be omitted.

This eighth embodiment is similar to the sixth embodiment, except that this eighth embodiment rotates the optical disk 1 in conformance with the ZCLV system in place of the CAV system during the recording. For example, the recording surface of the optical disk 1 is divided into N=4 zones in the radial direction, and the recording is carried out by rotating the optical disk 1 in conformance with the CLV system so that the rotational velocity (linear velocity) successively differs for each of the zones from the inner periphery towards the outer periphery, as 8×, 12×, 16× and 20×.

The processes carried out by the steps S51 through S56 prior to the recording in this eighth embodiment which employs the ZCLV system, are the same as those carried out in the sixth embodiment. In other words, the processes such as determination of the optimum recording power Pwo by the OPC are carried out once using the PCA 31.

When the processes carried out prior to the recording end, a step S71 shown in FIG. 13 carries out a seek to a recording target zone N of the optical disk 1 by moving the optical pickup 5, so as to start the recording operation. A step S72 successively calculates and sets the peak pulse width $\theta_2(v)$, the OFF-pulse width xn(v) and the optimum recording power Pwo(v), depending on the arbitrary linear velocity v related to the recording target zone N which is to be recorded by the optical pickup 5. The calculations are performed by adding corrections dependent on the arbitrary linear velocity v with respect to the optimum peak pulse width $\theta_2\_8\times$, the optimum OFF-pulse width xn_8× and the optimum recording power Pwo_8× which are set or determined by the process carried out prior to the recording. More particularly, the optimum recording power Pwo(v), the peak pulse width $\theta_2(v)$ and the OFF-pulse width xn(v) are defined by the continuous functions (12), (13) and (14) of the arbitrary linear velocity v described above. The process carried out by the step S72 corresponds to the function of the light emission waveform updating computation means.

A step S73 rotates the optical disk 1 by the spindle motor 2 in conformance with the CLV system so that the linear velocity v becomes the predetermined linear velocity for the zone N. The process carried out by the step S73 corresponds to the function of the recording rotation control means.

A step S74 carries out the recording operation with respect to the optical disk 1 in conformance with. the CLV system, while controlling the light emission waveform (write strategy) of the semiconductor laser via the laser control circuit 16 based on the peak pulse width $\theta_2(v)$, the OFF-pulse width xn(v) and the optimum recording power Pwo(v) which are successively calculated and updated by the step S72. The process carried out by the step S74 corresponds to the function of the recording light source control means.

When carrying out the recording by rotating the optical disk 1 in conformance with the ZCLV system, if the process of the sixth embodiment were carried out with respect to each zone, it would be necessary to set the peak pulse width $\theta_2(v)$ and the OFF-pulse width xn(v) for each of the linear velocities amounting to the number N of zones, and to determine the optimum recording power Pwo by the OPC. But according to this eighth embodiment, the setting of the peak pulse width $\theta_2(v)$ and the OFF-pulse width xn(v) and the determination of the optimum recording power Pwo only need to be carried out once based on the PCA 31 which has the predetermined radial position and in which the linear velocity is the predetermined linear velocity 8×. Thereafter, the peak pulse width $\theta_2(v)$, the OFF-pulse width xn(v) and the optimum recording power Pwo(v) can be successively calculated and set depending on the linear velocity v of the target recording zone, so that it is possible to always record the information under a stable recording condition, even with respect to the ZCLV system.

Figure 14:
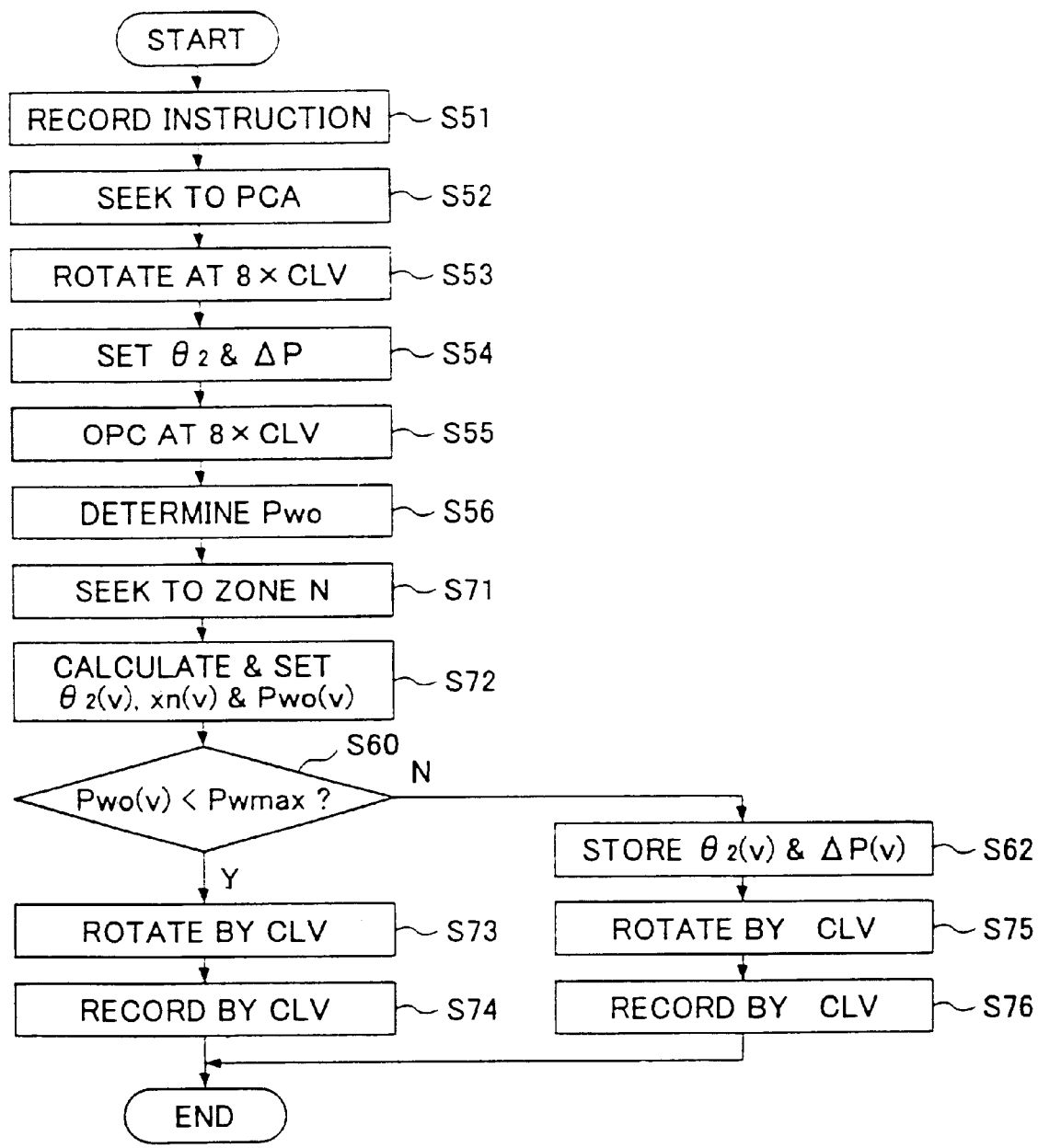
FIG. 14 is a flow chart for explaining a recording process of a ninth embodiment of the optical disk unit according to the present invention.

Next, a description will be given of a ninth embodiment of the optical disk unit according to the present invention, by referring to FIG. 14. FIG. 14 is a flow chart for explaining a recording process of this ninth embodiment of the optical disk unit. In FIG. 14, those steps which are the same as those corresponding steps in FIGS. 11 through 13 are designated by the same reference numerals, and a description thereof will be omitted.

In the eighth embodiment described above, the optimum recording power Pwo(v) calculated based on the continuous function (12) described above with respect to the recording zone in which the linear velocity is 20×CLV, for example, may exceed the maximum output Pwmax (predetermined upper limit value) of the semiconductor laser. In other words, it may not be possible to record at the optimum recording power Pwo(v) in such a case.

This ninth embodiment takes such a case into consideration. More particularly, during the actual recording operation, the step S60 shown in FIG. 14 decides whether or not the optimum recording power Pwo(v) which is successively calculated is less than the maximum output Pwmax (predetermined upper limit value) of the semiconductor laser. If the decision result in the step S60 is YES, the step S73 rotates the optical disk 1 in conformance with the ZCLV system, and the step S74 carries out the recording operation with respect to the optical disk 1 in conformance with the CLV system within the zone.

On the other hand, if the decision result in the step S60 is NO, the step S62 stores the optimum recording power Pwo(v) (=Pwmax) and the peak pulse width $\theta_2(v)$ and the OFF-pulse width xn(v) in this state, as the write strategy of the semiconductor laser, in order to record on the zones subsequent to the recording target zone. In addition, a step S75 switches the rotation of the spindle motor 2 to rotate the optical disk 1 at the linear velocity v which becomes constant in this state in conformance with the CLV system. A step S76 carries out the recording operation with respect to the optical disk 1 in conformance with the CLV system while controlling the light emission waveform (write strategy) of the semiconductor laser via the laser control circuit 16, based on the stored optimum recording power Pwo(v) (=Pwmax) and the peak pulse width $\theta_2(v)$ and the OFF-pulse width xn(v) in this state.

For example, if the optimum recording power Pwo(v) for the linear velocity 16×CLV becomes the maximum output Pwmax of the semiconductor laser, the recording operation with respect to the recording zone in which the linear velocity is 20×CLV is carried out by switching the linear velocity to 16×CLV in the step S75. In addition, the optimum recording power Pwo(v) is set to the maximum output Pwmax, and the peak pulse width $\theta_2(v)$ and the OFF-pulse width xn(v) for the linear velocity 16×CLV are set in the step S62. Furthermore, the recording operation is carried out in conformance with the CLV system by the steps S75 and S76.

The process carried out by the step S60 corresponds to the function of the judging means, and the process carried out by the step S75 corresponds to the function of the recording rotation control means. The process carried out by the step S76 corresponds to the function of the recording light source control means.

Therefore, according to this embodiment, a decision is made to determine whether or not the optimum recording power Pwo(v) reaches the maximum output Pwmax of the semiconductor laser. The recording is carried out in conformance with the CLV system at the original predetermined linear velocity in a recording zone region in which the maximum output Pwmax is not exceeded. On the other hand, in a recording zone region in which the maximum output Pwmax is reached or exceeded, the recording is carried out in conformance with the ZCLV system at the constant linear velocity which introduces no change in the linear velocity v within each recording zone. For this reason, it is possible to continue the recording at the maximum output of the semiconductor laser, and it is thus possible to cope with cases where the semiconductor laser used has a low maximum output for the recording power and the optical disk used has a low recording sensitivity, by a minimum required decrease in the recording velocity.

Figure 15:
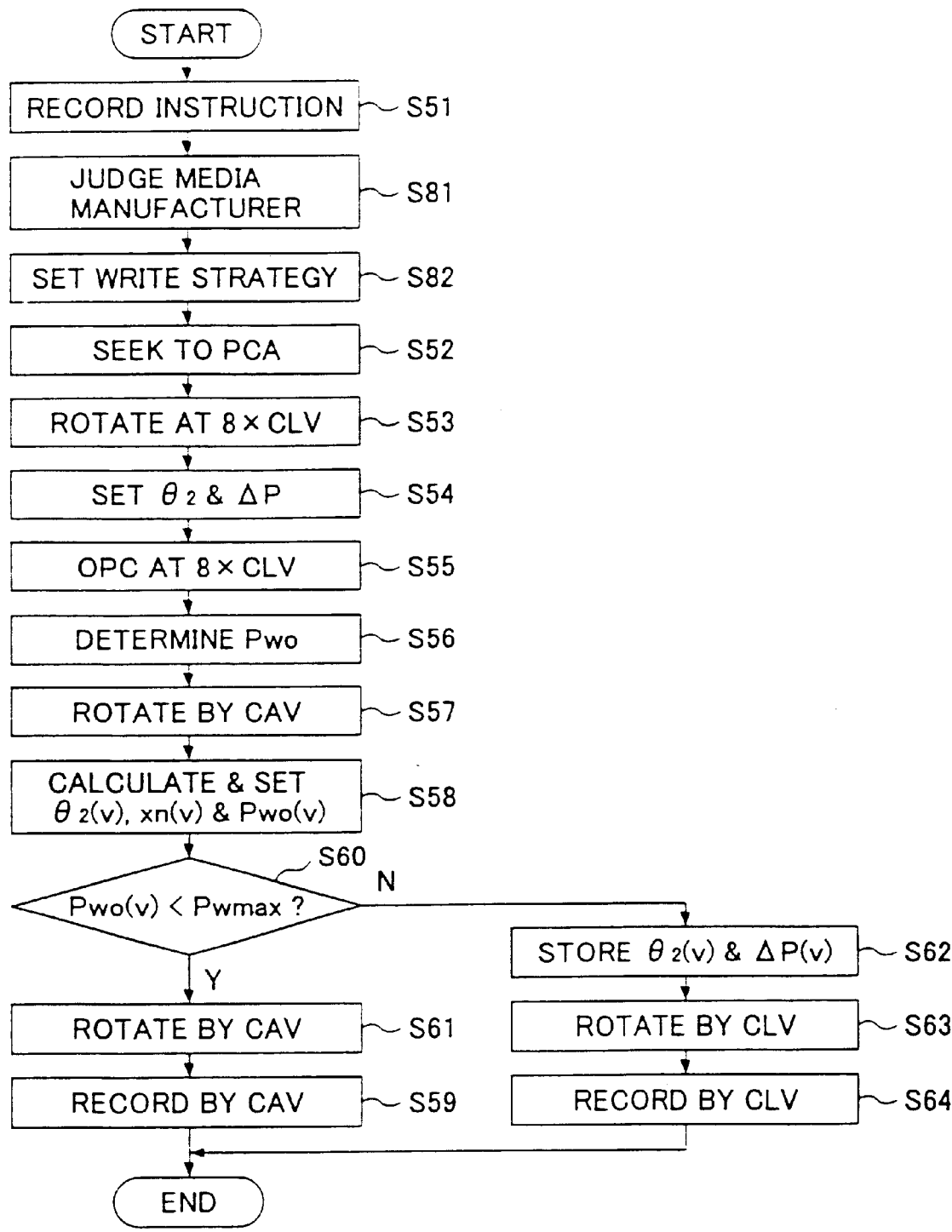
FIG. 15 is a flow chart for explaining a recording process of a tenth embodiment of the optical disk unit according to the present invention.

Next, a description will be given of a tenth embodiment of the optical disk unit according to the present invention, by referring to FIG. 15. FIG. 15 is a flow chart for explaining a recording process of this tenth embodiment of the optical disk unit. In FIG. 15, those steps which are the same as those corresponding steps in FIG. 12 are designated by the same reference numerals, and a description thereof will be omitted.

This tenth embodiment takes into consideration a manufacturer of the optical disk 1. Further, it is assumed for the sake of convenience that the manufacturer of the optical disk 1 is taken into consideration when using the seventh embodiment described above. Predetermined coefficients, optimum write strategies and the like which differ for each manufacturer are prestored in a memory such as the ROM 18 and the non-volatile memory 21 or, are successively updated and stored in the memory.

Under these preconditions, when the optical disk 1 is loaded into the optical disk unit, a step S81 shown in FIG. 15 identifies a manufacture code recorded on the optical disk 1 to judge the media manufacturer. Normally, in the case of the optical disk 1 such as the CD-RW, a lead-in-start-time recorded in the ATIP of the optical disk 1 differs for each media manufacturer, and thus, the media manufacturer can be judged by reading step S81 corresponds to the function of a manufacturer judging means.

After the media manufacturer is judged, a step S82 sets a write strategy corresponding to the judged media manufacturer, by reading the write strategy from a write strategy table which stores write strategies of various media manufacturers, optimized for a predetermined linear velocity. After the step S82, the process advances to the step S52 and the subsequent steps of the seventh embodiment described above.

When carrying out the successively updating and calculating process for the actual recording operation, a step S83 is carried out in place of the step S58. Basically, the step S83 is similar to the step S58, but differs in that the calculation is made using coefficients which are different for each media manufacturer. In other words, the step S83 performs the calculations by adding corrections dependent on the arbitrary linear velocity v and predetermined coefficients $\underline{a}$ through f which differ for each media manufacturer, with respect to the optimum peak pulse width $\theta_2\_8\times$, the optimum OFF-pulse width $xn\_8\times$ and the optimum recording power $Pwo\_8\times$ which are set or determined by the process carried out prior to the recording. More particularly, the optimum recording power $Pwo(v)$, the peak pulse width $\theta_2(v)$ and the OFF-pulse width $xn(v)$ are defined by the following continuous functions (15), (16) and (17) of the arbitrary linear velocity v. The process carried out by the step S83 corresponds to the function of the light emission waveform updating computation means.

$$Pwo(v)=Pwo\_8\times*sqrt\{(v/v\_8\times)*a+b\} \quad (15)$$

$$\theta_2(v)=\theta2\text{---}8\times*\{(v\_8x/v)*c+d\} \quad (16)$$

$$xn(v)xn\_8\times*\{(v\_8x/v)*e+f\} \quad (17)$$

In each of the sixth through ninth embodiments described above, such as the seventh embodiment, for example, it may not be possible to always record the information under the optimum recording condition depending on media manufacturer of the optical disk 1 used due to differences which exist among the media manufacturers, if the peak pulse width $\theta_2(v)$, the OFF-pulse width $xn(v)$ and the optimum recording power $Pwo(v)$ depending on the linear velocity v are calculated and set in the same manner for all media manufacturers of the optical disk 1. But according to this tenth embodiment, the media manufacturer of the optical disk 1 used is judged based on the identification code prerecorded on the optical disk 1, and the peak pulse width $\theta_2(v)$, the OFF-pulse width $xn(v)$ and the optimum recording power $Pwo(v)$ are respectively calculated by taking into consideration the coefficients $\underline{a}$ through f of the judged media manufacturer. The coefficients $\underline{a}$ through f are preset for each of the media manufacturers. As a result, it is possible to appropriately cope with the differences among the media manufacturers of the optical disk 1 which is used by the optical disk unit.

In this embodiment, even with respect to the same media manufacturer, the type, that is, a pigment layer, of the optical disk 1 used may differ depending on the case. In such a case where different types of optical disks of the same media manufacturer may be used in the optical disk unit, the information may not always be recorded under the appropriate recording condition. In such a case, the step S81 identifies a type code read from the optical disk 1, in addition to identifying the manufacture code of the optical disk 1. As a result, it is possible to judge the media manufacturer of the optical disk 1 and the type of the optical disk 1.

Normally, in the case of the optical disk 1 such as the CD-RW, the type code is indicated by a first digit of a frame of the lead-in-start-time recorded in the ATIP. In other words, it is possible to identify the type or, the pigment layer, of the optical disk 1 by reading the ATIP. The step S83 in this case takes into consideration the different types of the optical disk 1, and performs the calculations by adding corrections dependent on the arbitrary linear velocity v with respect to the optimum peak pulse width $\theta_2\_8\times$, the optimum OFF-pulse width $xn\_8\times$ and the optimum recording power $Pwo\_8\times$ which are set or determined by the process carried out prior to the recording. More particularly, the optimum recording power $Pwo(v)$, the peak pulse width $\theta_2(v)$ and the OFF-pulse width $xn(v)$ are defined by the following continuous functions (18), (19) and (20) of the arbitrary linear velocity v, where coefficients $\epsilon$, $\eta$ and $\delta$ differ depending on the type of the optical disk 1 and may be prestored in a memory such as the ROM 18 and the non-volatile memory 21.

$$Pwo(v)=Pwo\_8\times*sqrt\{(v/v\_8\times)*a*\epsilon+b\} \quad (18)$$

$$\theta_2(v)=\theta_2\_8\times*\{(v\_8x/v)*c*\eta+d\} \quad (19)$$

$$xn(v)=xn\_8\times*\{(v\_8x/v)*e*\delta+f\} \quad (20)$$

Therefore, according to this tenth embodiment which also judges the type of the optical disk 1, the peak pulse width $\theta_2(v)$, the OFF-pulse width $xn(v)$ and the optimum recording power $Pwo(v)$ are calculated by taking into consideration the values which are obtained by multiplying the coefficients $\epsilon$, $\eta$ and $\delta$ which differ depending on the type of the optical disk 1 with respect to the corresponding coefficients $\underline{a}$, c and e which are preset for each judged media manufacturer. Consequently, it is possible to appropriately cope with optical disks 1 manufactured by different media manufacturers as well as different type of optical disks 1.

Further, ,the present invention is not limited to these embodiments, but various variations and modifications may be made without departing from the scope of the present invention.

What is claimed is:

1. An apparatus for an optical disk unit having a light source for irradiating a light beam on a recordable optical disk, rotationally driving means for rotating the optical disk, recording rotation control means for controlling the rotationally driving means to rotate the optical disk when recording information, test write means for carrying out a test write prior to recording, setting means for presetting a value $\theta_1$ which prescribes an optimum recording pulse width of the light source and reference optimum recording power determination means for reproducing data recorded by the test write and determining an optimum recording power value Pwo based on characteristic values of the reproduced data, said apparatus comprising:

light emission waveform updating computation means for calculating (a) a value $\theta_1(v)$ which prescribes a recording pulse width and (b) an optimum recording power Pwo(v), depending on an arbitrary linear velocity v at a recording target track which is to be recorded, by adding corrections dependent on the arbitrary linear velocity v with respect to (i) the value $\theta_1$ which prescribes the optimum recording pulse width when recording the information and (ii) the optimum recording power value Pwo; and recording light source control means for controlling a light emission waveform of the light source during recording based on the value $\theta_1(v)$ which prescribes the recording pulse width and the optimum recording power Pwo(v).

2. The apparatus of claim 1, further comprising:

judging means for judging whether or not the optimum recording power Pwo(v) reaches a predetermined upper limit value of an output power of the light source, wherein the optical disk is rotated at a constant linear velocity in a track region in which the judging means judges that optimum recording power Pwo(v) reaches the predetermined upper limit value of the output power of the light source.

3. The apparatus of claim 1, further comprising:

manufacturer judging means for judging a manufacturer of the optical disk based on an identification code prerecorded on the optical disk, wherein the value $\theta_1(v)$ which prescribes the recording pulse width and the optimum recording power Pwo(v) are calculated depending on the arbitrary linear velocity v and coefficients which are preset for each manufacturer.

4. The apparatus of claim 3, wherein said manufacturer judging means further judges a type of the optical disk, and the coefficients based on which the value $\theta_1(v)$ which prescribes the recording pulse width and the optimum recording power Pwo(v) are calculated are multiplied by constants depending on a type of the optical disk.

5. An apparatus for an optical disk unit for recording information on a recordable optical disk which has a recording surface divided into a plurality of zones in a radial direction thereof, by rotating the optical disk at a rotational velocity which is different for each zone so that a linear velocity within each zone is approximately constant, said optical disk unit having a light source for irradiating a light beam on the optical disk, rotationally driving means for rotating the optical disk, recording rotation control means for controlling the rotationally driving means to rotate the optical disk at a rotational velocity which is different for each zone so that a predetermined linear velocity is approximately obtained within each zone when recording information, and test write means for carrying out a test write prior to recording, setting means for presetting a value $\theta_1$ which prescribes an optimum recording pulse width of the light source, and reference optimum recording power determination means for reproducing data recorded by the test write carried out by the test write means and determining an optimum recording power value Pwo based on characteristic values of the reproduced data, said apparatus comprising:

light emission waveform updating computation means for calculating for each recording target zone in which the information is to be recorded (a) a corresponding value $\theta_1(v)$ which prescribes a recording pulse width and (b) a corresponding optimum recording power Pwo(v), depending on an arbitrary linear velocity v at the recording target zone, by adding corrections dependent on the arbitrary linear velocity v with respect to (i) the value $\theta_1$ which prescribes the optimum recording pulse width when recording the information and (ii) the optimum recording power value Pwo; and recording light source control means for controlling a light emission waveform of the light source during recording based on the value $\theta_1(v)$ which prescribes the recording pulse width and the optimum recording power Pwo(v).

6. The apparatus of claim 5, further comprising:

judging means for judging whether or not the optimum recording power Pwo(v) reaches a predetermined upper limit value of an output power of the light source, wherein the optical disk is rotated at a linear velocity with which the predetermined upper limit value becomes the optimum recording power Pwo(v) in a recording zone region in which the judging means judges that the optimum recording power Pwo(v) reaches the predetermined upper limit value of the output power of the light source.

7. The apparatus of claim 5, further comprising:

manufacturer judging means for judging a manufacturer of the optical disk based on an identification code prerecorded on the optical disk, wherein the value $\theta_1(v)$ which prescribes the recording pulse width and the optimum recording power Pwo(v) are calculated depending on the arbitrary linear velocity v and coefficients which are preset for each manufacturer.

8. The apparatus of claim 7, wherein said manufacturer judging means further judges a type of the optical disk, and the coefficients based on which the value $\theta_1(v)$ which prescribes the recording pulse width and the optimum recording power Pwo(v) are calculated are multiplied by constants depending on a type of the optical disk.

9. An apparatus for an optical disk unit having rotationally driving means for rotating a rewritable optical disk, recording rotation control means for controlling the rotationally driving means to rotate the optical disk when recording information, test write means for carrying out a test write prior to recording, setting means for presetting an optimum peak pulse width value $\theta_2$ at a leading portion of multi-recording pulses of a light source and an OFF-pulse width value xn at a last portion of the multi-recording pulses, and reference optimum recording power determination means for reproducing data recorded by the test write carried out by the test write means and determining an optimum recording power value Pwo based on characteristic values of the reproduced data, said apparatus comprising:

light emission waveform updating computation means for calculating a peak pulse width $\theta_2(v)$, an OFF-pulse width xn(v) and an optimum recording power Pwo(v), depending on an arbitrary linear velocity v at a recording target track which is to recorded, by adding corrections dependent on the arbitrary linear velocity v with respect to the peak pulse width value $\theta_2$, the OFF-pulse width value xn and the optimum recording power value Pwo; and recording light source control means for controlling a light emission waveform of the light source during recording based on the peak pulse width $\theta_2(v)$, the OFF-pulse width xn(v) and the optimum recording power Pwo(v).

10. The apparatus of claim 9, further comprising:
judging means for judging whether or not the optimum recording power Pwo(v) reaches a predetermined upper limit value of an output power of the light source,
wherein the optical disk is rotated at a constant linear velocity in a track region in which the judging means judges that the optimum recording power Pwo(v) reaches the predetermined upper limit value of the output power of the light source.

11. The apparatus of claim 9, further comprising:
manufacturer judging means for judging a manufacturer of the optical disk based on an identification code prerecorded on the optical disk,
wherein the peak pulse width $\theta_2(v)$, the OFF-pulse width xn(v) and the optimum recording power Pwo(v) are calculated depending on the arbitrary linear velocity v and coefficients which are preset for each manufacturer.

12. The apparatus of claim 11, wherein
said manufacturer judging means further judges a type of the optical disk, and
wherein the coefficients based on which the peak pulse width $\theta_2(v)$, the OFF-pulse width xn(v) and the optimum recording power Pwo(v) are calculated are multiplied by constants depending on a type of the optical disk.

13. An apparatus for an optical disk unit for recording information on a rewritable optical disk which has a recording surface divided into a plurality of zones in a radial direction thereof, by rotating the optical disk at a rotational velocity which is different for each zone so that a linear velocity within each zone is approximately constant, said optical disk unit having a light source for irradiating a light beam on the optical disk, rotationally driving means for rotating the optical disk, recording rotation control means for controlling the rotationally driving means to rotate the optical disk at a rotational velocity which is different for each zone so that a predetermined linear velocity is approximately obtained within each zone when recording information, test write means for carrying out a test write prior to recording, setting means for presetting a peak pulse width value $\theta_2$ at a leading portion of multi-recording pulses of the light source and an OFF-pulse width value xn at a last portion of the multi-recording pulses, and reference optimum recording power determination means for reproducing data recorded by the test write carried out by the test write means and determining an optimum recording power value Pwo based on characteristic values of the reproduced data, said apparatus comprising:
light emission waveform updating computation means for calculating a peak pulse width $\theta_2(v)$, an OFF-pulse width xn(v) and an optimum recording power Pwo(v), depending on an arbitrary linear velocity v at a recording target zone which is to be recorded, by adding corrections dependent on the arbitrary linear velocity v with respect to the peak pulse width value $\theta_2$, the OFF-pulse width value xn and the optimum recording power value Pwo; and
recording light source control means for controlling a light emission waveform of the light source during recording based on the peak pulse width $\theta_2(v)$, the OFF-pulse width xn(v) and the optimum recording power Pwo(v).

14. The apparatus of claim 13, further comprising:
judging means for judging whether or not the optimum recording power Pwo(v) reaches a predetermined upper limit value of an output power of the light source,
wherein the optical disk is rotated at a linear velocity with which the predetermined upper limit value becomes the optimum recording power Pwo(v) in a recording zone region in which the judging means judges that the optimum recording power Pwo(v) reaches the predetermined upper limit value of the output power of the light source.

15. The apparatus of claim 13, further comprising:
manufacturer judging means for judging a manufacturer of the optical disk based on an identification code prerecorded on the optical disk,
wherein the peak pulse width $\theta_2(v)$, the OFF-pulse width xn(v) and the optimum recording power Pwo(v) are calculated depending on the arbitrary linear velocity v and coefficients which are preset for each manufacturer.

16. The apparatus of claim 15, wherein
said manufacturer judging means further judges a type of the optical disk, and
the coefficients based which the peak pulse width $\theta_2(v)$, the OFF-pulse width xn(v) and the optimum recording power Pwo(v) are calculated are multiplied by constants depending on the type of the optical disk.

17. An optical disk unit for recording information on a recordable optical disk, said optical disk unit comprising:
a light source;
a processor coupled to the light source to control the light source during recording,
wherein the processor is adapted to calculate (a) a value $\theta_1(v)$ which prescribes a recording pulse width and (b) an optimum recording power Pwo(v), depending on an arbitrary linear velocity v at a recording target track which is to be recorded, by adding corrections dependent on the arbitrary linear velocity v with respect to (i) a value $\theta_1$ which prescribes an optimum recording pulse width when recording the information on the optical disk and (ii) an optimum recording power value Pwo, and
the processor controls a light emission waveform of the light source during recording based on the value $\theta_1(v)$ which prescribes the recording pulse width and the optimum recording power Pwo(v).

18. The apparatus of claim 17, wherein
the processor is further adapted to judge whether or not the optimum recording power Pwo(v) reaches a predetermined upper limit value of an output power of the light source, and
the optical disk is rotated at a constant linear velocity in a track region in which the processor judges that the optimum recording power Pwo(v) reaches the predetermined upper limit value of the output power of the light source.

19. The apparatus of claim 17, wherein
the processor is further adapted to judge a manufacturer of the optical disk based on an identification code prerecorded on the optical disk, and
the value $\theta_1(v)$ which prescribes the recording pulse width and the optimum recording power Pwo(v) are calculated depending on the arbitrary linear velocity v and coefficients which are preset for each manufacturer.

20. The apparatus of claim 19, wherein
the processor is further adapted to judge a type of the optical disk, and the coefficients based on which the value $\theta_1(v)$ which prescribes the recording pulse width and the optimum recording power Pwo(v) are calculated are multiplied by constants depending on a type of the optical disk.

21. An an optical disk unit for recording information on a recordable optical disk which has a recording surface divided into a plurality of zones in a radial direction thereof, by rotating the optical disk at a rotational velocity which is different for each zone so that a linear velocity within each zone is approximately constant, said optical disk unit comprising:

a light source;

a processor coupled to the light source to control the light source during recording, wherein the processor is adapted to calculate for each recording target zone in which the information is to be recorded (a) a corresponding value $\theta_1(v)$ which prescribes a recording pulse width and (b) a corresponding optimum recording power Pwo(v), depending on an arbitrary linear velocity v at the recording target zone, by adding corrections dependent on the arbitrary linear velocity v with respect to (i) a value $\theta_1$ which prescribes the optimum recording pulse width when recording the information and (ii) an optimum recording power value Pwo, and the processor controls a light emission waveform of the light source during recording based on the value $\theta_1(v)$ which prescribes the recording pulse width and the optimum recording power Pwo(v).

22. The apparatus of claim 21, wherein the processor is further adapted to judge whether or not the optimum recording power Pwo(v) reaches a predetermined upper limit value of an output power of the light source, and the optical disk is rotated at a linear velocity with which the predetermined upper limit value becomes the optimum recording power Pwo(v) in a recording zone region in which the processor judges that the optimum recording power Pwo(v) reaches the predetermined upper limit value of the output power of the light source.

23. The apparatus of claim 21, wherein the processor is further adapted to judge a manufacturer of the optical disk based on an identification code prerecorded on the optical disk, and the value $\theta_1(v)$ which prescribes the recording pulse width and the optimum recording power Pwo(v) are calculated depending on the arbitrary linear velocity v and coefficients which are preset for each manufacturer.

24. The apparatus of claim 23, wherein the processor is further adapted to judge a type of the optical disk, and the coefficients based on which the value $\theta_1(v)$ which prescribes the recording pulse width and the optimum recording power Pwo(v) are calculated are multiplied by constants depending on a type of the optical disk.

25. An optical disk unit for recording information on a rewritable optical disk, said optical disk unit comprising:

a light source;

a processor coupled to the light source to control the light source during recording, wherein the processor is adapted to calculate a peak pulse width $\theta_2(v)$, an OFF-pulse width xn(v) and an optimum recording power Pwo(v), depending on an arbitrary linear velocity v at a recording target track in which the information is to be recorded, by adding corrections dependent on the arbitrary linear velocity v with respect to a peak pulse width value $\theta_2$, an OFF-pulse width value xn and an optimum recording power value Pwo; and the processor controls a light emission waveform of the light source during recording based on the peak pulse width $\theta_2(v)$, the OFF-pulse width xn(v) and the optimum recording power Pwo(v).

26. The apparatus of claim 25, wherein the processor is further adapted to judge whether or not the optimum recording power Pwo(v) reaches a predetermined upper limit value of an output power of the light source, and the optical disk is rotated at a constant linear velocity in a track region in which the processor judges that the optimum recording power Pwo(v) reaches the predetermined upper limit value of the output power of the light source.

27. The apparatus of claim 25, wherein the processor is further adapted to judge a manufacturer of the optical disk based on an identification code prerecorded on the optical disk, the peak pulse width $\theta_2(v)$, the OFF-pulse width xn(v) and the optimum recording power Pwo(v) are calculated depending on the arbitrary linear velocity v and coefficients which are preset for each manufacturer.

28. The apparatus of claim 27, wherein the processor is further adapted to judge a type of the optical disk, and the coefficients based on which the peak pulse width $\theta_2(v)$, the OFF-pulse width xn(v) and the optimum recording power Pwo(v) are calculated are multiplied by constants depending on a type of the optical disk.

29. An optical disk unit for recording information on a rewritable optical disk which has a recording surface divided into a plurality of zones in a radial direction thereof, by rotating the optical disk at a rotational velocity which is different for each zone so that a linear velocity within each zone is approximately constant, said optical disk unit comprising:

a light source;

a processor coupled to the light source to control the light source during recording, wherein the processor is adapted to calculate a peak pulse width $\theta_2(v)$, an OFF-pulse width xn(v) and an optimum recording power Pwo(v), depending on an arbitrary linear velocity v at a recording target zone in which the information is to be recorded, by adding corrections dependent on the arbitrary linear velocity v with respect to a peak pulse width value $\theta_2$, an OFF-pulse width value xn and an optimum recording power value Pwo, and the processor controls a light emission waveform of the light source during recording based on the peak pulse width $\theta_2(v)$, the OFF-pulse width xn(v) and the optimum recording power Pwo(v).

30. The apparatus of claim 29, wherein the processor is further adapted to judge whether or not the optimum recording power Pwo(v) reaches a predetermined upper limit value of an output power of the light source, and the optical disk is rotated at a linear velocity with which the predetermined upper limit value becomes the optimum recording power Pwo(v) in a recording zone region in which the processor judges that the optimum recording power Pwo(v) reaches the predetermined upper limit value of the output power of the light source.

31. The apparatus of claim 29, wherein
the processor is further adapted to judge a manufacturer of the optical disk based on an identification code prerecorded on the optical disk, and
the peak pulse width $\theta_2(v)$, the OFF-pulse width xn(v) and the optimum recording power Pwo(v) are calculated depending on the arbitrary linear velocity v and coefficients which are preset for each manufacturer.

32. The apparatus of claim 31, wherein
the processor is further adapted to judge a type of the optical disk, and
the coefficients based which the peak pulse width $\theta_2(v)$, the OFF-pulse width xn(v) and the optimum recording power Pwo(v) are calculated are multiplied by constants depending on the type of the optical disk.

33. A method for recording information on a recordable optical disk, comprising:
calculating (a) a value $\theta_1(v)$ which prescribes a recording pulse width and (b) an optimum recording power Pwo(v), depending on an arbitrary linear velocity v at a recording target track which is to be recorded, by adding corrections dependent on the arbitrary linear velocity v with respect to (i) a value $\theta_1$ which prescribes an optimum recording pulse width when recording the information and (ii) an optimum recording power value Pwo; and
recording the information while controlling a light emission waveform of a light source based on the value $\theta_1(v)$ which prescribes the recording pulse width and the optimum recording power Pwo(v).

34. The method of claim 33, further comprising:
judging whether the optimum recording power Pwo(v) calculated depending on the arbitrary linear velocity v on the recording target track reaches a predetermined upper limit value of an output power of the light source; and
rotating the optical disk at a constant linear velocity in a track region in which the optimum recording power Pwo(v) is judged to have reached the predetermined upper limit value of the output power of the light source.

35. The method of claim 33, further comprising:
judging a manufacturer of the optical disk based on an identification code prerecorded on the optical disk,
wherein the value $\theta_1(v)$ which prescribes the recording pulse width and the optimum recording power Pwo(v) are calculated depending on the arbitrary linear velocity v and coefficients which are preset for each manufacturer.

36. The method of claim 35, further comprising:
judging a type of the optical disk,
wherein the coefficients based on which the value $\theta_1(v)$ which prescribes the recording pulse width and the optimum recording power Pwo(v) are calculated are multiplied by constants depending on a type of the optical disk.

37. A system, comprising:
a processor; and
a program storage device readable by the computer system, tangibly embodying a program of instructions executable by the processor to perform the method claimed in claim 33.

38. A program storage device readable by a machine, tangibly embodying a program of instructions executable by the machine to perform the method claimed in claim 33.

39. A method for recording information on a recordable optical disk which has a recording surface divided into a plurality of zones in a radial direction thereof, by rotating the optical disk at a rotational velocity which is different for each zone so that a linear velocity within each zone is approximately constant, comprising:
calculating for each recording target zone in which the information is to be recorded (a) a corresponding value $\theta_1(v)$ which prescribes a recording pulse width and (b) a corresponding optimum recording power Pwo(v), depending on an arbitrary linear velocity v at the recording target zone, by adding corrections dependent on the arbitrary linear velocity v with respect to (i) a value $\theta_1$ which prescribes an optimum recording pulse width when recording the information and (ii) an optimum recording power value Pwo; and
recording the information while controlling a light emission waveform of the light source based on the value $\theta_1(v)$ which prescribes the recording pulse width and the optimum recording power Pwo(v).

40. The method of claim 39, further comprising:
judging whether the optimum recording power Pwo(v) calculated depending on the arbitrary linear velocity v on the track reaches a predetermined upper limit value of an output power of the light source; and
rotating the optical disk at a linear velocity with which the predetermined upper limit value becomes the optimum recording power Pwo(v) in a recording zone region in which the optimum recording power Pwo(v) is judged to reach the predetermined upper limit value of the output power of the light source.

41. The method of claim 39, further comprising:
judging a manufacturer of the optical disk based on an identification code prerecorded on the optical disk,
wherein the value $\theta_1(v)$ which prescribes the recording pulse width and the optimum recording power Pwo(v) are calculated depending on the arbitrary linear velocity v and coefficients which are preset for each manufacturer.

42. The method of claim 41, further comprising:
judging a type of the optical disk,
wherein the coefficients based on which the value $\theta_1(v)$ which prescribes the recording pulse width and the optimum recording power Pwo(v) are calculated are multiplied by constants depending on a type of the optical disk.

43. A system, comprising:
a processor; and
a program storage device readable by the computer system, tangibly embodying a program of instructions executable by the processor to perform the method claimed in claim 39.

44. A program storage device readable by a machine, tangibly embodying a program of instructions executable by the machine to perform the method claimed in claim 39.

45. A method for recording information on a rewritable optical disk, comprising:
calculating a peak pulse width $\theta_2(v)$, an OFF-pulse width xn(v) and an optimum recording power Pwo(v), depending on an arbitrary linear velocity v at a recording target track in which the information is to be recorded, by adding corrections dependent on the arbitrary linear velocity v with respect to a peak pulse width value $\theta_2$, an OFF-pulse width value xn and an optimum recording power value Pwo; and recording the information while controlling a light emission waveform of a light source based on the peak pulse width $\theta_2(v)$, the OFF-pulse width xn(v) and the optimum recording power Pwo(v).

46. The method of claim 45, further comprising:

judging whether the optimum recording power Pwo(v) which depends on the arbitrary linear velocity v on the track reaches a predetermined upper limit value of an output power of the light source; and rotating the optical disk at a constant linear velocity in a track region in which the optimum recording power Pwo(v) is judged to reach the predetermined upper limit value of the output power of the light source.

47. The method of claim 45, further comprising:

judging a manufacturer of the optical disk based on an identification code prerecorded on the optical disk, wherein the peak pulse width $\theta_2(v)$, the OFF-pulse width xn(v) and the optimum recording power Pwo(v) are calculated depending on the arbitrary linear velocity v and coefficients which are preset for each manufacturer.

48. The method of claim 47, further comprising:

judging a type of the optical disk, wherein the coefficients based on which the peak pulse width $\theta_2(v)$, the OFF-pulse width xn(v) and the optimum recording power Pwo(v) are calculated are multiplied by constants depending on a type of the optical disk.

49. A system, comprising:

a processor; and a program storage device readable by the computer system, tangibly embodying a program of instructions executable by the processor to perform the method claimed in claim 45.

50. A program storage device readable by a machine, tangibly embodying a program of instructions executable by the machine to perform the method claimed in claim 45.

51. A method for recording information on a rewritable optical disk which has a recording surface divided into a plurality of zones in a radial direction thereof, by rotating the optical disk at a rotational velocity which is different for each zone so that a linear velocity within each zone is approximately constant, comprising:

calculating for each recording target zone in which the information is to be recorded a corresponding peak pulse width $\theta_2(v)$, a corresponding OFF-pulse width xn(v) and a corresponding optimum recording power Pwo(v), depending on an arbitrary linear velocity v at the recording target zone, by adding corrections dependent on the arbitrary linear velocity v with respect to a peak pulse width value $\theta_2$, an OFF-pulse width value xn and an optimum recording power value Pwo; and recording the information while controlling a light emission waveform of a light source based on the peak pulse width $\theta_2(v)$, the OFF-pulse width xn(v) and the optimum recording power Pwo(v).

52. The method of claim 51, further comprising:

judging whether the optimum recording power Pwo(v) which depends on the arbitrary linear velocity v on the track reaches a predetermined upper limit value of an output power of the light source, rotating the optical disk at a linear velocity with which the predetermined upper limit value becomes the optimum recording power Pwo(v) in a recording zone region in which the optimum recording power Pwo(v) is judged to reach the predetermined upper limit value of the output power of the light source.

53. The method of claim 51, further comprising:

judging a manufacturer of the optical disk based on an identification code prerecorded on the optical disk, wherein the peak pulse width $\theta_2(v)$, the OFF-pulse width xn(v) and the optimum recording power Pwo(v) are calculated depending on the arbitrary linear velocity v and coefficients which are preset for each manufacturer.

54. The method of claim 53, further comprising:

judging a type of the optical disk, wherein the coefficients based which the peak pulse width $\theta_2(v)$, the OFF-pulse width xn(v) and the optimum recording power Pwo(v) are calculated are multiplied by constants depending on the type of the optical disk.

55. A system, comprising:

a processor; and a program storage device readable by the computer system, tangibly embodying a program of instructions executable by the processor to perform the method claimed in claim 51.

56. A program storage device readable by a machine, tangibly embodying a program of instructions executable by the machine to perform the method claimed in claim 51.

57. An apparatus for an optical disk unit having a light source for irradiating a light beam on a recordable optical disk, a test write circuit for carrying out a test write prior to recording to the optical disk, a setting circuit for presetting a value $\theta_1$ which prescribes an optimum recording pulse width of the light source, and a reference optimum recording power determination circuit for reproducing data recorded by the test write and determining an optimum recording power value Pwo based on characteristic values of the reproduced data, said apparatus comprising:

a light emission waveform updating computation circuit for calculating (a) a value $\theta_1(v)$ which prescribes a recording pulse width and (b) an optimum recording power Pwo(v), depending on an arbitrary linear velocity v at a recording target track which is to be recorded, by adding corrections dependent on the arbitrary linear velocity v with respect to (i) the value $\theta_1$ which prescribes the optimum recording pulse width when recording the information and (ii) the optimum recording power value Pwo; and a recording light source control circuit for controlling a light emission waveform of the light source during recording based on the value $\theta_1(v)$ which prescribes the recording pulse width and the optimum recording power Pwo(v).

58. The apparatus of claim 57, further comprising:

a judging circuit for judging whether or not the optimum recording power Pwo(v) reaches a predetermined upper limit value of an output power of the light source, wherein the optical disk is rotated at a constant linear velocity in a track region in which the judging circuit judges that optimum recording power Pwo(v) reaches the predetermined upper limit value of the output power of the light source.

59. The apparatus of claim 57, further comprising:

a manufacturer judging circuit for judging a manufacturer of the optical disk based on an identification code prerecorded on the optical disk, wherein the value $\theta_1(v)$ which prescribes the recording pulse width and the optimum recording power Pwo(v)

are calculated depending on the arbitrary linear velocity v and coefficients which are preset for each manufacturer.

60. The apparatus of claim 59, wherein said manufacturer judging circuit further judges a type of the optical disk, and the coefficients based on which the value $\theta_1(v)$ which prescribes the recording pulse width and the optimum recording power Pwo(v) are calculated are multiplied by constants depending on a type of the optical disk.

61. An apparatus for an optical disk unit for recording information on a recordable optical disk which has a recording surface divided into a plurality of zones in a radial direction thereof, by rotating the optical disk at a rotational velocity which is different for each zone so that a linear velocity within each zone is approximately constant, said optical disk unit having a light source for irradiating a light beam on the optical disk, a test write circuit for carrying out a test write prior to recording of the information to the optical disk, a setting circuit for presetting a value $\theta_1$ which prescribes an optimum recording pulse width of the light source, and a reference optimum recording power determination circuit for reproducing data recorded by the test write carried out by the test write circuit and determining an optimum recording power value Pwo based on characteristic values of the reproduced data, said apparatus comprising:

a light emission waveform updating computation circuit for calculating for each recording target zone in which the information is to be recorded (a) a corresponding value $\theta_1(v)$ which prescribes a recording pulse width and (b) a corresponding optimum recording power Pwo(v), depending on an arbitrary linear velocity v at the recording target zone, by adding corrections dependent on the arbitrary linear velocity v with respect to (i) the value $\theta_1$ which prescribes the optimum recording pulse width when recording the information and (ii) the optimum recording power value Pwo; and a recording light source control circuit for controlling a light emission waveform of the light source during recording based on the value $\theta_1(v)$ which prescribes the recording pulse width and the optimum recording power Pwo(v).

62. The apparatus of claim 61, further comprising:

a judging circuit for judging whether or not the optimum recording power Pwo(v) reaches a predetermined upper limit value of an output power of the light source, wherein the optical disk is rotated at a linear velocity with which the predetermined upper limit value becomes the optimum recording power Pwo(v) in a recording zone region in which the judging circuit judges that the optimum recording power Pwo(v) reaches the predetermined upper limit value of the output power of the light source.

63. The apparatus of claim 61, further comprising:

a manufacturer judging circuit for judging a manufacturer of the optical disk based on an identification code prerecorded on the optical disk, wherein the value $\theta_1(v)$ which prescribes the recording pulse width and the optimum recording power Pwo(v) are calculated depending on the arbitrary linear velocity v and coefficients which are preset for each manufacturer.

64. The apparatus of claim 63, wherein said manufacturer judging circuit further judges a type of the optical disk, and the coefficients based on which the value $\theta_1(v)$ which prescribes the recording pulse width and the optimum recording power Pwo(v) are calculated are multiplied by constants depending on a type of the optical disk.

65. An apparatus for an optical disk unit for recording information on a rewritable optical disk, said optical disk unit having a test write circuit for carrying out a test write prior to recording, a setting circuit for presetting an optimum peak pulse width value $\theta_2$ at a leading portion of multi-recording pulses of a light source and an OFF-pulse width value xn at a last portion of the multi-recording pulses, and a reference optimum recording power determination circuit for reproducing data recorded by the test write carried out by the test write circuit and determining an optimum recording power value Pwo based on characteristic values of the reproduced data, said apparatus comprising:

a light emission waveform updating computation circuit for calculating a peak pulse width $\theta_2(v)$, an OFF-pulse width xn(v) and an optimum recording power Pwo(v), depending on an arbitrary linear velocity v at a recording target track which is to recorded, by adding corrections dependent on the arbitrary linear velocity v with respect to the peak pulse width value $\theta_2$, the OFF-pulse width value xn and the optimum recording power value Pwo; and a recording light source control circuit for controlling a light emission waveform of the light source during recording based on the peak pulse width $\theta_2(v)$, the OFF-pulse width xn(v) and the optimum recording power Pwo(v).

66. The apparatus of claim 65, further comprising:

a judging circuit for judging whether or not the optimum recording power Pwo(v) reaches a predetermined upper limit value of an output power of the light source, wherein the optical disk is rotated at a constant linear velocity in a track region in which the judging circuit judges that the optimum recording power Pwo(v) reaches the predetermined upper limit value of the output power of the light source.

67. The apparatus of claim 65, further comprising:

a manufacturer judging circuit for judging a manufacturer of the optical disk based on an identification code prerecorded on the optical disk, wherein the peak pulse width $\theta_2(v)$, the OFF-pulse width xn(v) and the optimum recording power Pwo(v) are calculated depending on the arbitrary linear velocity v and coefficients which are preset for each manufacturer.

68. The apparatus of claim 67, wherein said manufacturer judging circuit further judges a type of the optical disk, and wherein the coefficients based on which the peak pulse width $\theta_2(v)$, the OFF-pulse width xn(v) and the optimum recording power Pwo(v) are calculated are multiplied by constants depending on a type of the optical disk.

69. An apparatus for an optical disk unit for recording information on a rewritable optical disk which has a recording surface divided into a plurality of zones in a radial direction thereof, by rotating the optical disk at a rotational velocity which is different for each zone so that a linear velocity within each zone is approximately constant, said optical disk unit having a light source for irradiating a light beam on the optical disk, a test write circuit for carrying out a test write prior to recording, a setting circuit for presetting a peak pulse width value $\theta_2$ at a leading portion of multi-recording pulses of the light source and an OFF-pulse width value xn at a last portion of the multi-recording pulses, and a reference optimum recording power determination circuit for reproducing data recorded by the test write carried out by the test write circuit and determining an optimum recording power value Pwo based on characteristic values of the reproduced data, said apparatus comprising:

- a light emission waveform updating computation circuit for calculating a peak pulse width $\theta_2(v)$, an OFF-pulse width xn(v) and an optimum recording power Pwo(v), depending on an arbitrary linear velocity v at a recording target zone which is to be recorded, by adding corrections dependent on the arbitrary linear velocity v with respect to the peak pulse width value $\theta_2$, the OFF-pulse width value xn and the optimum recording power value Pwo; and
- a recording light source control circuit for controlling a light emission waveform of the light source during recording based on the peak pulse width $\theta_2(v)$, the OFF-pulse width xn(v) and the optimum recording power Pwo(v).

70. The apparatus of claim 69, further comprising:

a judging circuit for judging whether or not the optimum recording power Pwo(v) reaches a predetermined upper limit value of an output power of the light source, wherein the optical disk is rotated at a linear velocity with which the predetermined upper limit value becomes the optimum recording power Pwo(v) in a recording zone region in which the judging circuit judges that the optimum recording power Pwo(v) reaches the predetermined upper limit value of the output power of the light source.

71. The apparatus of claim 69, further comprising:

a manufacturer judging circuit for judging a manufacturer of the optical disk based on an identification code prerecorded on the optical disk, wherein the peak pulse width $\theta_2(v)$, the OFF-pulse width xn(v) and the optimum recording power Pwo(v) are calculated depending on the arbitrary linear velocity v and coefficients which are preset for each manufacturer.

72. The apparatus of claim 71, wherein said manufacturer judging circuit further judges a type of the optical disk, and the coefficients based which the peak pulse width $\theta_2(v)$, the OFF-pulse width xn(v) and the optimum recording power Pwo(v) are calculated are multiplied by constants depending on the type of the optical disk.

* * * * *